US00RE43753E

(19) United States
(12) Reissued Patent
Szabo

(10) Patent Number: US RE43,753 E
(45) Date of Reissued Patent: *Oct. 16, 2012

(54) GRAPHIC USER INTERFACE FOR DATABASE SYSTEM

(75) Inventor: Andrew J. Szabo, Riverside, CT (US)

(73) Assignee: Alberti Anemometer LLC, Los Altos, CA (US)

( * ) Notice: This patent is subject to a terminal disclaimer.

(21) Appl. No.: 10/728,743

(22) Filed: Dec. 4, 2003

Related U.S. Patent Documents

Reissue of:
(64) Patent No.: 6,326,962
Issued: Dec. 4, 2001
Appl. No.: 09/353,305
Filed: Jul. 13, 1999

U.S. Applications:
(63) Continuation of application No. 08/772,650, filed on Dec. 23, 1996, now Pat. No. 5,966,126.

(51) Int. Cl.
*G06F 13/00* (2006.01)

(52) U.S. Cl. ..... 715/835; 715/968

(58) Field of Classification Search ..... 715/835, 715/762–763, 771–773, 853–855, 966–968, 715/767, 802, 803, 804, 805, 821–823, 745–747; 707/10, 200, 35
See application file for complete search history.

(56) References Cited

U.S. PATENT DOCUMENTS 4,674,042 A 6/1987 Hernandez et al.
4,674,043 A 6/1987 Hernandez et al.
4,853,843 A 8/1989 Ecklund
5,175,814 A 12/1992 Anick et al.
5,418,950 A 5/1995 Li et al.
5,421,008 A * 5/1995 Banning et al. ..... 707/4
5,442,738 A 8/1995 Chapman et al.
5,452,468 A * 9/1995 Peterson ..... 345/419
5,495,567 A * 2/1996 Iizawa et al. ..... 715/762
5,515,488 A 5/1996 Hoppe et al.
5,542,024 A * 7/1996 Balint et al. ..... 715/853
5,544,267 A 8/1996 Mahoney et al.
5,590,325 A * 12/1996 Kolton et al. ..... 707/3
5,596,699 A * 1/1997 Driskell ..... 715/834

(Continued)

OTHER PUBLICATIONS

Sullivan, The Search Engine Report, Dec. 22, 1996, No. 2; http://www.searchenginewatch.com/sereport/print.phy/34721_2153741.

(Continued)

*Primary Examiner* — Steven Sax
(74) *Attorney, Agent, or Firm* — Fitch, Even, Tabin & Flannery, LLP

(57) ABSTRACT

A graphic user interface method for representing a search of a database, providing a plurality of stylized Venn diagrams each representing an intersection of at least two sets; receiving from the user, for each generic graphic icon, a selection of at least one region, defining an output data set; presenting the generic graphic icons on the graphic user interface as modified graphic icons, each having graphic indication of the selections; and receiving linkage information from the user for the modified graphic icons to represent a composite set inclusion property, based on the output data sets and the linkage information. Once a search is defined, it may be translated, as necessary, for execution by a typical database search engine. Retrieved results may be quautified and ranked by the interface system fur optimal presentation to the user.

46 Claims, 16 Drawing Sheets

U.S. PATENT DOCUMENTS

| | | | | | |
|---|---|---|---|---|---|
| 5,608,854 | A | * | 3/1997 | Labedz et al. | 345/441 |
| 5,668,966 | A | * | 9/1997 | Ono et al. | 715/853 |
| 5,678,012 | A | * | 10/1997 | Kimmich et al. | 725/37 |
| 5,717,923 | A | | 2/1998 | Dedrick | |
| 5,724,424 | A | | 3/1998 | Gifford | |
| 5,724,521 | A | | 3/1998 | Dedrick | |
| 5,724,524 | A | | 3/1998 | Hunt et al. | |
| 5,748,954 | A | | 5/1998 | Mauldin | |
| 5,751,286 | A | * | 5/1998 | Barber et al. | 715/835 |
| 5,752,238 | A | | 5/1998 | Dedrick | |
| 5,754,765 | A | * | 5/1998 | Danneels et al. | 709/222 |
| 5,768,521 | A | | 6/1998 | Dedrick | |
| 5,774,357 | A | | 6/1998 | Hoffberg et al. | |
| 5,794,210 | A | | 8/1998 | Goldhaber et al. | |
| 5,826,241 | A | | 10/1998 | Stein et al. | |
| 5,845,264 | A | | 12/1998 | Nelhaus | |
| 5,848,397 | A | | 12/1998 | Marsh et al. | |
| 5,848,407 | A | | 12/1998 | Ishikawa et al. | |
| 5,852,820 | A | | 12/1998 | Burrows | |
| 5,855,008 | A | | 12/1998 | Goldhaber et al. | |
| 5,864,845 | A | | 1/1999 | Voorhees et al. | |
| 5,864,846 | A | | 1/1999 | Voorhees et al. | |
| 5,867,386 | A | | 2/1999 | Hoffberg et al. | |
| 5,875,108 | A | | 2/1999 | Hoffberg et al. | |
| 5,895,468 | A | * | 4/1999 | Whitmyer, Jr. | 1/1 |
| 5,901,246 | A | | 5/1999 | Hoffberg et al. | |
| 5,903,454 | A | | 5/1999 | Hoffberg et al. | |
| 5,903,882 | A | | 5/1999 | Asay et al. | |
| 5,918,014 | A | | 6/1999 | Robinson | |
| 5,920,477 | A | | 7/1999 | Hoffberg et al. | |
| 5,920,854 | A | | 7/1999 | Kirsch et al. | |
| 5,920,859 | A | | 7/1999 | Li | |
| 5,966,126 | A | * | 10/1999 | Szabo | 715/762 |
| 5,983,220 | A | | 11/1999 | Schmitt | |
| 6,005,977 | A | * | 12/1999 | Tanimizu et al. | 382/216 |
| 6,026,397 | A | | 2/2000 | Sheppard | |
| 6,034,676 | A | * | 3/2000 | Egan et al. | 701/29 |
| 6,078,866 | A | | 6/2000 | Buck et al. | |
| 6,175,655 | B1 | * | 1/2001 | George et al. | 382/257 |
| 6,192,351 | B1 | * | 2/2001 | Persaud | 706/2 |
| 6,285,999 | B1 | | 9/2001 | Page | |
| 6,326,962 | B1 | | 12/2001 | Szabo | |
| 6,418,424 | B1 | | 7/2002 | Hoffberg et al. | |
| 6,463,431 | B1 | | 10/2002 | Schmitt | |

OTHER PUBLICATIONS

Sullivan, The Search Engine Report, Jul. 23, 1996, No. 1; http://www.searchenginewatch.com/sereport/print.phy/34721_2205961.

Sullivan, The Search Engine Report, Jan. 31, 1997, No. 3; http://www.searchenginewatch.com/sereport/print.phy/34721_2205971.

Engine sells results, draws fire; http://news.com.com/2102-1023_3-215491.html?tag=st.util.print.

Inder, et al., "Sustaining Ineraction in Database Query".

Keim, et al., "VisDB: Database Exploration Using Multidimensional Visualization", Ludwig-Maximilians-Universitat Munchen, Institut fur Informatik, Bericht 9413, Aug. 1994.

Ahlberg, et al., "IVEE: An Environment for Automatic Creation of Dynamic Queries Applications".

Eick, "Data Visulaization Sliders"; UIST'94 Conference Proceedings, pp. 119-120, Nov. 1994.

Carr, "Using Interaction Object Graphs to Specify Graphical Widgets".

Osada, et al., "AlphaSlider: Searching Textual Lists with Sliders".

Ahlberg, et al., "The Alphaslider: A Compact and Rapid Selector".

Hibino, et al., "A Graphical Query Language for Identifying Temporal Trends in Video Data", University of Michigan Technical Report, Nov. 1994.

Hibino, et al., "MMVIS: Design and Implementation of a MultiMedia Visual Information Seeking Environment", ACM Multimedia '96 Conference Proceeding, Nov. 1996.

Hibino, et al., "User Interface Evaluation of a Direct Manipulation Temporal Visual Query Language", ACM Multimedia '97 Conference Proceedings, Seattle, WA.

Ahlberg, et al., "Visual Information Seeking: Tight Coupling of Dynamic Query Filters with Starfield Displays".

Liao, et al., "Browsing Unix Directories with Dynamic Queries: An Evaluation of Three Information Display Techniques", http://citeseer.nj.nec.com/check/429647.

Crowder, "Telltale User Documentation".

"Customized Vitamin Packaging a Hit", 2 pages.

Levin, Carol, "New Web Tool Reads Minds," PC Magazine, Sep. 10, 1996, p. 36.

Vadlamudi, Pardhu, "Software offers graphical cues for Web searches, links," Infoworld, Jan. 6, 1997, p. 28.

* cited by examiner

FIGURE 1A

Basic Operators

| A<br>Boolean Logic | B<br>Set Theory | C<br>Propositional Logic | D<br>Conventional Logic Diagram | E<br>BGI | F<br>Diagrammatic Boole Logic |
|---|---|---|---|---|---|
| AND | $\cap$ | $\wedge$ | | | AND |
| OR | $\cup$ | $\vee$ | | | OR |
| NOT | $/$ | $\vDash$ | | | NOT |
| EXCLUSIVE OR | | | | | EXCLUSIVE OR |
| NOT OR (NOR) | $\not\cup$ | | | | NOR OR NOT OR |
| NOT AND (NAND) | $\not\cap$ | | | | NAND OR NOT OR |

FIGURE 1B

Other Operators

| Description | E SCI |
|---|---|
| TIME DELAY | |
| START/ GO FORWARD | |
| STOP | |
| STATUS OK | |
| REVERSE/ GO BACKWARD | |
| RANK | |
| RANK | |
| WEIGHTED AVERAGE | |
| STATISICAL ANALYSIS | |
| INDUCTIVE LOGIC | |
| DEDUCTIVE LOGIC | |
| TOP DOWN SEARCH | |
| BOTTOM UP SEARCH | |
| INTELLIGENT AGENT | |
| ADAPTIVE INTERFACE | |
| CRISP LOGIC | |
| FUZZY LOGIC | |
| REPEAT | |
| ROBUST MORE/LESS (Tweaks.) | |
| QUANTILE | |
| REMOVE TAILSOF DISTRIBUTION (Bm 2 Standard Deviations) | |
| OUTLIERS | |
| LAUNCH (Applications.) | |

| Description | E SCI |
|---|---|
| ROBUST MORE/LESS (Tweaks.) | |
| QUANTILE | |
| REMOVE TAILSOF DISTRIBUTION (Bm 2 Standard Deviations) | |
| OUTLIERS | |
| LAUNCH (Applications.) | |
| BLOCK-MODELLING | |
| LINEAR ANALYSIS | |
| NON-LINEAR ANALYSIS | |
| DISCONTINUOUS DATA | |
| HETEROSCEDASTICITY | |
| NEGATIVE SKEW | |
| POSITIVE SKEW | |
| NON-INDEPENDENT DATA | |
| EXPERIMENTAL ANALYSIS | |
| EVOLUTIONARY ANALYSIS | |
| NONSENSE | |
| MULTICOLLINEARITY | |
| ADD LIQUID | |
| STEP UP | |
| STEP DOWN | |
| BEAT INGREDIENTS | |
| HEAT | |
| COOL | |

FIGURE IC
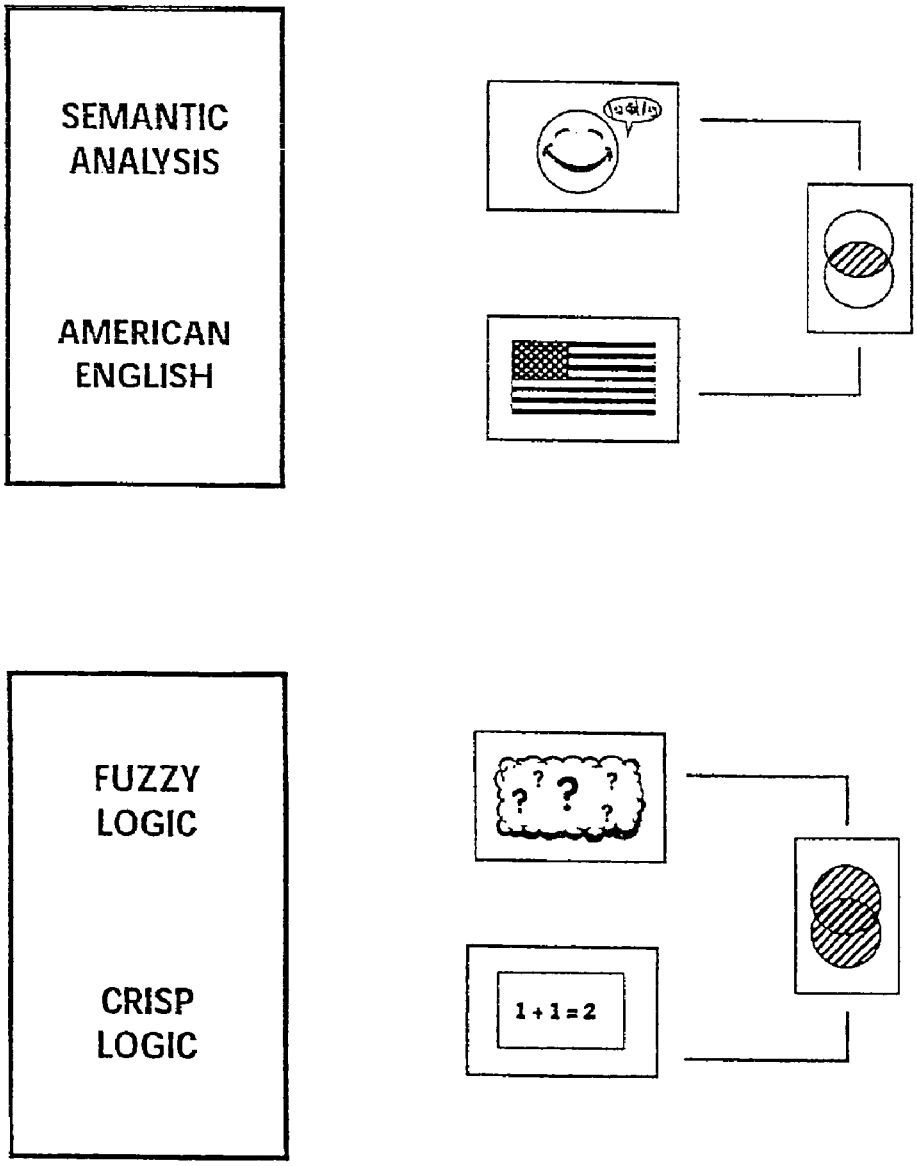

FIGURE 2A

| | |
|---|---|
| [(TRADED: NASDAQ N-MARKET) | OR |
| (TRADED NYSE)] | AND |
| (COMMON STOCK) | AND |
| (P/E < 12x) | AND |
| P/BOOK < 1.25x) | AND |
| (DIVIDEND YIELD > 4%) | AND NOT |
| (FINANCIAL SECTOR COMPANY) | |

Parametric Controls

OUTPUT OPTIONS

GRAPHIC USER INTERFACE FOR DATABASE SYSTEM

Matter enclosed in heavy brackets [ ] appears in the original patent but forms no part of this reissue specification; matter printed in italics indicates the additions made by reissue.

The present application is a Continuation of U.S. patent application Ser. No. 08/772,650 filed Dec. 23, 1996, the entirety of which is expressly incorporated herein by reference U.S. Pat. No. 5,966,126.

FIELD OF THE INVENTION

The present invention relates to the field of graphic user interfaces for computer systems, and more particularly to graphic user interface systems having graphic objects representing data sets, in which a manipulation of the graphic object instructs the system to perform logical or set theory operations on the data represented by the graphic object.

BACKGROUND OF THE INVENTION

Traditionally, graphic user interfaces (hereinafter "GUIs") have been employed to facilitate interaction of a user with the file and execution system of a computer system, to present information graphically and/or in a manner approximating a printed page ("what you see is what you get" or "WYSIWYG"), or to present a desktop metaphor. Of course, there are other aspects of modern GUIs not encompassed by this generalization, but which are known to those skilled in the art.

Typical graphic objects in a GUI are icons presented on a background or "desktop", with icons each representing a set of files, application programs, system resources, or the like. These icons may be relocated or selected, which instructs the underlying operating system to relocate the referenced file in the directory structure, execute or open the file, depending on its type, or to operate on one referenced file by another referenced application. A known paradigm is "drag and drop", which allows the one or more objects, represented by one or more icons, to be operated on by another object, also represented by a graphic object or icon. Such functions include, but are not limited to, move, copy, execute, filter, open, print, and delete. In general, however, the user does not operate to modify the icon itself with a corresponding function executed by the operating system or application.

In addition, within a group of objects, the objects may be ranked, e.g., by name, type, size, date, location, relevance to search criterion, or other attribute. Thus, by defining a graphic object representing a set of files, functions may be performed on the set of files. These known GUIs operate at a computer or disk operating system level, and thus typically operate on data sets which represent discrete files. Known GUIs include Apple Macintosh Operating System 7 and Microsoft Windows 95 and Windows NT.

Another paradigm for dealing with data in more typical databases includes GUIs for database system formulation. In these systems, data sets include a plurality of addressable records. The database operations are represented graphically and may be manipulated by the user to formulate a search or report. In this case, functions may be chained, so that complex database searches may be formulated by graphic representations of elemental operations. These systems do not, however, provide a generic icon which is modified to reflect a data subset employed. In general, these known systems are employed in the design of a database system or customized reports, rather than by a user to formulate a search during normal use of the system. This is because these graphic operations represent program steps or objects, and therefore the resulting complex program must still be verified and debugged. These systems also present different icons for each function, to allow distinguishability. As used in these systems, the graphical programming features are not generally intended to make relatively simple searches more efficient, but rather to allow a programmer to formulate complex reports at a relatively high level.

The use of search engines to search databases is known. So is the ability to use Boolean logical connectors to conduct a search. The use of a set of results of a Boolean search to perform a new search, by modification of a Boolean operator or the addition of new Boolean constraints, is known.

The use of Venn diagrams is known in mathematical set theory. Other graphical representations include histograms, line graphs, circle graphs, star graphs, matrices, and scatter plot diagrams. In general, the applicability of these different types of graphical representations relies on the ability of a user to define desired subsets, e.g., using crisp logic, fuzzy logic, graphic regions of the set space, or other criterion, such as a ranking according to a criteria, to define the desired subset.

However, it is not well known in the art of front ends for search engines or browsers to use well-articulated graphical representations of set theory, including graphical representations of the logical operations "AND", "OR" and "NOT," and any symbols that are used tend to be static and non-manipulable.

U.S. Pat. No. 5,551,488, expressly incorporated herein by reference in the entirety, provides a system in which a graphical representation of a narrowing query set operation, e.g., a Venn diagram representing two sets within a data space, is provided within a window. Each window represents a data space, and the window includes but a single representation. The search may be modified by selecting areas of the graphic object representation within the window. There is no provision for employing the graphical representation as an icon. Thus, this system allows the user to visualize the element of the search in a graphical representation, but does not graphically represent the chaining of search criteria.

U.S. Pat. No. 5,544,267, expressly incorporated herein by reference in the entirety, provides a system in which an imprecise sketch of a graphical set representation is inputted and interpreted by a computer system. This system does not provide for interactive modification of the search based on the graphic representation.

U.S. Pat. No. 5,418,950, expressly incorporated herein by reference in the entirety, relates to a graphic structured query language ("SQL") query generator system. This system employs graphic models of SQL language commands to generate a report. There is no provision for manipulation of configuration or selection of subsidiary objects within graphic icons to represent set inclusion criteria.

U.S. Pat. No. 5,442,738, expressly incorporated herein by reference in the entirety, provides a system in which a logical and arithmetic relation of objects may be defined and manipulated using a GUI. The graphic objects themselves, however, are not modified in configuration nor are subsidiary objects within graphic representations selected to represent a selection of set inclusion criteria.

None of the above-cited references formalizes a system of notation, bounded and conventionally stylized, whether for display on a computer or otherwise, for description of traditional logical relationships of conventional logic diagrams, or for translation to and from conventional logic diagrams.

Traditional logical symbols are arcane, and do not intuitively represent the set inclusion criteria. Thus, while AND, OR and NOT are readily understood, a complex expression employing such words may become incomprehensible. Conventional symbols, in which AND is represented by a half circle, OR by a heavy vertical line, NOT by a circle, Exclusive OR by a sort of shield, are not intuitive. Likewise, the use of ∩, ∪ and / to represent AND, OR and NOT in set theory, and ∧, ∨, ⊨in propositional logic, are also not intuitive.

SUMMARY OF THE INVENTION

The present invention pertains to a system for formulating and refining a search, by employing a "live" graphic icon representing set operators that may be modified and/or linked. This representation is preferably bounded and conventionally stylized, providing a more intuitive language for the presentation and use of logical relationships between elements. The icons are also preferably selected from a small group of generic icons, which are visually modified to indicate a set function.

Aspects of the present invention address the following problems of existing front ends for browsers or search engines:

(1) proliferation of results, which are extremely time consuming or impossible to consider in their totality; and alternatively a paucity of results;
(2) aggregation of data results, in many cases, in one undifferentiated pile;
(3) loss of the logical history of a search, and the corresponding hot links, requiring reentering and researching of requests in some cases;
(4) lack of an intuitively appealing graphic representation either of a projected search or the results thereof,
(5) lack of an intuitively appealing graphic interface for interaction with an "intelligent agent";
(6) lack of a suitable graphic interface for manipulation of index and table of contents data;
(7) lack of a suitable graphic interface to handle a search of two or more databases simultaneously;
(8) lack of a suitable graphic interface for handling complex data searches involving fuzzy logic; and
(9) lack of an intuitively appealing interface to represent the results of a database search.
(10) Lack of a graphic interface for search processes that is universally understandable, regardless of one's natural language.

The present invention therefore addresses these problems, and provides other advantages, through a new type of system for dealing with data sets graphically at a user, rather than programmer, level. As envisioned by the present invention, sets of data within a data space are represented graphically. In general, the data set represented by the graphic representation are defined by a rule or set of rules. However, a particular advantage of the present invention is that a plurality of these graphic representations, each representing a different data set defined by a different rule or set of rules, may be defined and depicted on the interface, either discretely, sequentially or simultaneously. Typically, a user will seek to use the database system to help define an optimal resulting data subset, wherein the rule or rules defining that data set are unknown at the outset or are inefficiently defined as a single consolidated set of rules. Thus, by defining a group of less complex rule sets, and then consolidating the rule sets, the desired information may be analyzed and extracted.

One aspect of the present system therefore presents a basic or generic icon, defining a plurality of logical data regions representing a Boolean relationship of two or more data sets. For simplicity, the majority of the present description will focus on the relationship of two sets, with the extensions to the representation of three or more sets as known in the art.

In a preferred embodiment, a generic icon is provided as a Venn diagram icon, divided into four set spaces, with two intersecting circles in a rectangular box. The space within each circle and not intersecting defining two set spaces, the intersection defining a third set space, and the external area defining a fourth set space. These act spaces are independently selectable, defining the various binary operators of the elements of sets A and B, in groups of up to four spaces, as shown in FIG. 6:

| set space | number of regions not empty |
|---|---|
| null set | (0) |
| A NOT B | (1) |
| B NOT A | (1) |
| NOT (A OR B) | (1) |
| A AND B | (1) |
| A | (2) |
| B | (2) |
| NOT A | (2) |
| NOT B | (2) |
| A XOR B | (2) |
| NOT (A XOR B) | (2) |
| A OR NOT (A OR B) | (3) |
| B OR NOT (A OR B) | (3) |
| NOT (A AND B) | (3) |
| A OR B | (3) |
| A OR NOT A | (4) |

In this system, a generic graphic icon is defined having a boundary and two intersecting areas in the boundary, each area representing a data set, an intersecting portion of the areas representing a conjunction of the data sets. The generic icon thus has four discrete regions, the portion outside the union of the areas, an intersecting portion of the areas, and portions within one area and not within the other area. A selection of one or more regions within the boundary is received from the user to define an output data set and presenting the generic graphic icon on the GUI as a first modified graphic icon, having visual indication of the selected regions corresponding to the defined output set. In addition, a set inclusion property is defined to correspond to each data set for the first modified graphic icon. These graphic icons may be selected from a pick list or tool bar or generated from a template generic icon. For example, commonly used relationships may be provided on a tool bar, with all possibilities available by manipulation of a generic icon template, in which selected regions are altered, e.g., change color. The icon may then be used in a larger graphic representation of a complex logical definition, by chaining or linking a plurality of icons together. This chaining or linking process is generally by graphic connector lines which connect the inputs and outputs of the iconic representation. These connector lines may be smart, i.e., intelligently routed, spaced and sized in accordance with the overall search strategy, graphic presentation and page or presentation layout.

A preferred Venn diagram icon according to the present invention includes a rectangular box with two overlapping circles staggered symmetrically along the elongated axis. Each circle is connected to a line intersecting a side of the box, either spaced through an elongated side or through opposite short sides, from the outside. A third line emanates from an elongated side of the box, opposite the inputs if these pass through au elongated side. Each line may be provided with an arrowhead to indicate the nature of the line as generally being considered an input or an output, with an arrowhead pointing inward for an input and outward for an output. The circle closest to each line corresponds to that line. The standard Venn diagram notation is employed, e.g., a change in color or density of a circle to represent selection of a particular set, with each graphic region representing a different subset of the data space.

The standard Boolean set operators fail to provide certain useful functions, such as ranges, chronology, ranking, proximity and semantic features. These operations are often useful or critical in formulating a desired search. Therefore, the present invention extends the standard Boolean logic with these known search operators to provide potentially full functionality within the iconic representation.

Often, these complex features may be formulated in Boolean terms. For example, a semantic or linguistic analysis of a term may provide a number of synonyms and antonyms, foreign language equivalents, as well as words related by root. Therefore, a search for a word as a concept may be broadened by providing a search based on the meaning, as expressed through the linguistic or semantic analysis. This meaning may be formulated as a Boolean expression, albeit complex. According to the present invention, this complex expression may be represented by a single icon, for example a Venn diagram, or chain of diagrams, having, for example, an "L" next to it, an icon of a person speaking, an icon of a mouth, a flag indicating the country of the language spoken, or a combination thereof, indicating extended linguistic analysis. The linguistic analysis might also display a representation of parallel linguistic analysis in different languages, for example, as a set of parallel icons, allowing the user to select one or more of the outputs.

In other cases, traditional Boolean logical expressions cannot readily represent the search concept, such as a proximity of two terms. In this case, a cumber of alternatives are present. First, a separate icon may be used which represents a distance between two search terms, which may be presented as, for example, a rectangular icon having a number or value in the middle representing the distance, and an upper and lower arrow representing a desired change in the value. Alternately, an icon representing a set inclusion property having a parametric modifier may be identified by a "flag" adjacent to the icon being operated on, for example located on top of or pierced by an input or output arrow. This operator may thus replace the Venn diagram operator, as a separate icon, where the Boolean operation AND is implied, or act as a modifier for an input or output of a Venn diagram operator, where full flexibility of Boolean functions are available.

This parametric search modifier may be applied in multiple dimensions, as well. For example, a numeric mean and range may be applied to a search by providing four controls over a parameter. This, however, leads to relatively large icons which appear more like windows, and indeed are generally provided at the program level as windows, without title bars and the like. In this same manner, icons may be constructed for any particular application. The goal, however, is to minimize the number of icon types and provide generic icons which may represent a number of different search elements, providing an intuitive visual indication of the function of the icon.

It may also be desirable to include the parametric functionality within the Venn diagram operator. In this case, an operator is provided with two intersecting areas, e.g., circles within a Venn diagram. The relative size of a circle represents the operator for a parameter determining a single set inclusion rule, and a relative position of the circle represents the operator for a parameter determining a multiple set inclusion rule. These parameters are generally continuous or stepwise continuous variables, and thus a resizing or tug on a circle instructs the system to change a scope of an input or output parameter, respectively. In this case, after manipulation, the icon returns to its original configuration, so that further relative changes may be applied. During manipulation, a different graphic image may be presented to the user, visually indicative of the change in progress.

For example, a truncation, thesaurus, or relevance rule may be applied based on a parametric operator. The set inclusion operator need not be unidimensional, and in the case of dimensions of the set inclusion or ranking rule, not readily accessible through the icon interface, the user will, for example, double click on the object or portion of the object to display a multidimensional graph, such as a circle having a plurality of spaced radially oriented axes. In many instances, a set of slide controls, each labeled with an associated characteristic for variation, is preferred, and may be easily provided using standard GUI software developer's kits. The slide controls may represent parametric or non-parametric variables.

In general, in each case, one or possibly two designated default parametric operators will be represented by the alteration of the iconic representation, while some or all of the set inclusion properties may be accessed by way of the secondary operation.

In contrast to many types of traditional icons, which are purely graphic elements which signify an underlying program object, the icons of the present invention are active, and manipulable to signal to the computer a user input. In the Venn diagram example provided above, the icons are sensitive to gestures of position and size of internal objects. In other instances, the system may be sensitive to other types of gestures and employ different graphical representations of sets.

A preferred system according to the present invention provides icons having generally one or two inputs and one output, with more complex constructs available by combining, chaining or linking the available icons. Of course, efficiency may be gained in certain instances by providing functions with a greater number of inputs and/or outputs, and where these are commonly used, they may be provided as accessible icons. For example, a multiple input OR or AND may be provided.

In general, the use of multidimensional icons is preferably avoided, it least as a default, in order to simplify the interface and improve the ergonomics of use. Therefore, a default operation is defined, which will generally be a predetermined variable based on the data types and possible context sensitivity and artificial intelligence analysis of the problem. In a system with a local or easily accessible database, for example, the interface may conduct a sensitivity analysis to determine the selective power of various criteria, and present as the default criterion that criterion with a desired selectivity pattern. Where the database is remote, difficult or expensive to access, e.g., where it is desired that access to the database be efficiently used, the selective criterion may be defined by the user or suggested to the user by the interface.

To generate a typical query, producing a resultant data set, the user defines a plurality of input sets, and then establishes a logical relationship between the inputs. The input set definitions may be produced in known manner, such as by explicit definition, or through use of assistive technologies, such as natural language translators. The formulated search may then be presented to the user for tuning, fine control, or modification. The input criteria may thus be schematic or imprecise, and indeed an advantage of the present invention is its ability to graphically assist the user in refining the search.

In a further embodiment according to the invention, one or more set inclusion criteria are associated with a graphic indication of the number, ratio, amount or relationship of set members included and/or excluded by the criteria, and the relationship of one set criterion with another criterion. For example, two criteria may be redundant, e.g., highly correlated. Therefore, one of the criteria may be eliminated, simplifying the search. Further, by analyzing the search parameters, the system may be able to assist the user in formulating other searches which meet the user's criteria, for example changing the scope of the search or applying a corresponding search to another database.

As stated above, it is preferred that complex searches be formulated generally employing simple binary operations. The present invention therefore allows chaining of the binary representations, in a tree format, to achieve these complex results or transfer functions. This allows the user to view the formulation of the search and to modify any element within the formulation, which may immediately update the entire search structure or selectively update based on relevance or another criterion.

In providing feedback or output to the user, a number of strategies may be used, or hybrids of the strategies, as appropriate. For example, in an on-line database, there may be charges, access fees or latencies for each search. Therefore, in this case, it is desired to formulate a search entirely before executing; on the other hand, the results of a search or a portion of the search may be readily available, and such may be updated immediately. In some instances, a portion of the database may be readily accessible, and a portion difficult to access, and these search requests may be scheduled and/or dispatched accordingly. Further, results may be returned in various sequences, and these may be presented to the user in a non-confusing manner. In some instances, where database access is low cost, but latencies are high, such as with a number of Internet based resources, it may be advantageous for the interface system to dispatch searches in advance of a final determination, which are predicted to be of at least the desired scope. These may then be narrowed or sorted with less penalty, and with a shorter latency from the finalization of the search criteria.

For example, in a text proximity search, an initial search with an AND operator may be initiated, with the resulting "hits" subjected to a proximity filter.

In using the system, the user will normally interact with the interface based on two possible scenarios; first, that a finite "correct" set of results exists, and the GUI database system is used to assist in obtaining the correct result, and second that no single "correct" set of results exists, and the GUI database system is used to define thresholds, ranges, boundaries, grey zones, rankings and so forth, so as to map a search strategy to select an acceptable result or range of results. In the former case, the user may be able to determine the "correct" result when it is presented, while in the latter case, the user relies on the search strategy to present all data which meet the search criteria.

In either case, the present invention provides a graphic object which is manipulated, for example, portions selected, repositioned or resized on the display with respect to the other graphic objects, to represent a set operation to be performed on the data set. Each set representation includes graphic objects which are "selectable" and modifiable, meaning the graphic object may be operated on separately from other graphic objects, but more importantly, any new data sets resulting from the set operation are represented by a secondary (or tertiary etc.) graphic object which is also "selectable". Further, these primary and higher order sets can also be graphically merged or re-merged by use of the same graphic operators.

The interface system may, as a default, present ranked set members according to the inclusion criteria, with a weighting test where multivariable inclusion criteria are employed. The user then may modify this ranking by, for example, opening a text dialog box or a graphic window. In certain instances, the ranking criterion may be defined by graphically manipulating an icon or graphic image in corresponding mariner to the set inclusion criterion, while in other instances it is preferably defined explicitly by the user. Thus, with multivariate set inclusion criteria, the user may be presented with a star graph icon for defining the relative weighting of each of the multiple variables in the rankings.

When ranking data, a multiple key ranking system may be implemented with weightings applied to the different factors or combinations of factors. Thus, when booking airline tickets, the various criteria may be ranked, and an optimal available flight booked. The criteria are, for example, availability, price, airport, schedule, carrier, availability of a block of seats, as necessary, mode of transportation, amenities, frequent flier perks, and seat position. The computer system retrieves information from one or more carrier databases, such as AA Sabre, and then conducts a negotiation based on a strategy defined by the user. This negotiation strategy may be adaptive, explicitly defined by the user, or based on an artificial intelligence system embedded in the interface guided by the user. The various criteria may, for example, be presented to the user as a group of graphic boxes which the user stacks in order to define a relative importance of the various criteria. Alternately, a set of slider controls in a dialog box or window may be presented to allow the user to weight each criterion independently.

In some instances, portions of the data may be hierarchically ranked, such as patent classifications, prerequisite trees for some college level classes, and professional and manufacturing directories. Therefore, this hierarchy may be used to define the desired set, rank the resulting members of the set and derive cutoffs.

Where data is hierarchical, it is possible that one defined set is a subset of another defined set. Therefore, the intersection of these sets is the subset. When this happens, certain of the possible functions become trivial. Therefore, where the interface system is able to detect this condition, or other conditions which make some of the interface functions trivial or inoperative, such as an empty defined set or intersection set, a set definition which encompasses the entire data space, redundant set definitions, etc., the interface may warn the user to avoid inefficiency. Of course, there are instances where this information will be unavailable to the interface prior to execution of a search, in which case the interface will perform its normal functions, even with these trivializations.

There are many different ways to graphically represent data and sets of data, and the present invention therefore preferably allows use of various optimized graphic representations of the underlying data sets and set operations, depending on the preferences of the user and the context. These graphic representations may be applied both for inputting and outputting data, and indeed the input and output representations need not be the same. Just as in descriptive statistics, form follows function. For example, a simple two dimensional line graph may be adequate to describe two variables but not, for example, five. One embodiment of the present invention will advise the user, or select by default for the user, optimal graphical representations of a given problem.

A common method of graphically representing set operations, and a preferred representation according to the present invention, is the Venn diagram, wherein the data space is represented by a plane, and sets in the data space represented by contiguous bounded areas on the plane. Set operations are represented by toe intersection of lines and the overlap of spaces defined by the contiguous bounded areas on the plane. In this case, an overlap of two areas represents an AND, while the combined area bounded by each "disjoint" (separate) area represents an OR operation. Using unitary Venn diagrams, more complex logic is less easily represented, i.e., while such representations are possible, they may require display systems with greater than two dimensions fur greater than three sets. However, by chaining of binary operations, more complex processes can be readily presented on a single 2-D screen or page; indeed, such chaining is fundamental to the present invention.

The present system is not limited to searching data sets using crisp logic, and may therefore include fuzzy logic searches having corresponding set inclusion properties and set member rankings. In this case, the manipulation of graphic objects need not be limited to binary or crisp logic relationships, and therefore an amount or proportionality of movement may be used to indicate a set inclusion property or set function. Thus, the Venn diagram operator may be used to represent fuzzy logic set inclusion properties and gestures used to alter the boundaries of a fuzzy set or logical operations between fuzzy sets.

Thus, typically, a search of a full text database or other types of complex data, including images, audio information, scientific data, industrial data, financial data, etc., does not contemplate a single, finite, and final response; rather a broad search is conducted from which the resulting data set is further optimized, based on the application of further rules or manual review of the records. Therefore, a search strategy for these types of situations often proceeds with an expectation of a number or clustering of relevant data records to be extracted from the data space, with the search strategy refined until the expectation is met or the expectation altered. In this case, by providing a graphical representation of the data sets in an optimized format, the set inclusion characteristics may be easily modified, or the modifications reversed or respecified, using the GUI, for example by using a graphical pointing device to shrink or expand sets or intersections of sets. In other words, according to various embodiments of the invention, each portion or region of the graphical representation is potentially the subject of selection or configurational modification, representing a desired alteration in the corresponding set inclusion criteria.

It is noted that, for a given set, the graphical representation of refining set inclusion criteria need not be a multiset representation and therefore may be a separate representation from the Venn diagram icon. Where binary set operations are chained, and each input to a successive analysis is considered a set, an attempt to modify a composite set must be analyzed to determine the significance of a change to the set of inclusion criteria for the composite set. Artificial intelligence techniques may be applied to analyze the composite set inclusion criteria, and to propose an analogous change to the search which corresponds to the gesture or indication of the user. Thus, in a full text proximity searchable system, search criteria A AND B might, tor example, be narrowed in the order of A (same section) B, A (same paragraph) B, A (same sentence) B, A (adjacent) B. Alternately, the word spacing between A AND B may be narrowed by successively reducing the operator, A (within n words of) B. Using artificial intelligence, these various schemes may be intermixed, and indeed, the search strategy may be tuned based on a number of reported hits; if too low, the strategy is made less restrictive, if too high, it is made more restrictive, according to the hierarchy of the search.

As stated above, the present invention also allows search restrictions based on secondary criteria, such as rankings. These rankings may be included with the proximity operators. Thus, it can be seen that the present invention may include an intelligent interface which selects various available searching tools in order to refine a search. If these refinements are inappropriate, the intelligent interface may be adaptive to the user, and learn a desired search strategy, which may be applied globally, for a particular user, or during a particular search session.

In another example, a typical full text search using relevance based search technology will result in a ranked list of "hits", with presumably most relevant information at the top of the list and less relevant information at the bottom of the list. This ranking methodology is known in the art. When a search is modified, essentially a new search must be conducted with a new relevance ranked list generated. If this ranked list is represented graphically, a different set of inclusion rules may be defined, resulting in a different data set, represented by another graphic object. Since each set or criterion may be ranked, it might be concluded that overlapping items higher on the list have greater significance than overlapping items lower in the list. Alternately, the ranking of the overlapping data may be redetermined based on a composite ranking algorithm, such as a weighted average paradigm. In either case, this ranking may be graphically represented, and the user may apply a threshold function to the graphically presented data to limit the data set.

A ranking of a resulting set from a search may advantageously be graphically represented, in order to allow tuning of the underlying search strategy or the ranking algorithm. A trained user will, for example, view a sample of the resulting data sets to determine whether the search strategy returns the desired information, and if so, with what degree of quality. On the other hand, a user may have no or little basis for making such a determination. In these various instances, the searching system may apply a range of rules, from those narrowly defined by the user, to broad generic rules devised to adequately encompass many different searching scenarios. A user may review a list of set membership, and manually include, exclude or rank members. The database system then formulates an "intelligent agent" based on the actions of the user, which extracts a ranking or inclusion rule to complete the task or to search other data spaces for relevant data or continues the task for the remainder of the data.

In order to rank set members by multiple criteria, a weighting function may be applied to the different criteria. According to the present invention, this weighting function may be indicated graphically. It is noted that the ranking or weighting functions are not constrained in have any relationship with the set inclusion criteria, although in many instances this will be the case.

When ranking a set member, a primary set inclusion criterion is fulfilled, and generally only then is a secondary criterion applied to order the set members. In this case, the ranking is generally applied where the next stage of the process truncates the first set based on this ranking, for example taking only a certain number of set members or those having a ranking score above a certain level.

It is important to understand that, in cases where the search is simple and the user has a clear expectation of the desired results, the advantages of the present invention are primarily provided by the efficiencies gained by employing a visually intuitive set theory paradigm interface, and the searching technique itself will likely parallel a typical prior art search i.e., the user will apply specific and concrete search criteria, explicitly tailoring the search to the desired scope, rather than relying on graphic tools to assist in defining the search scope. On the other hand, with complex search strategies or where an accurate expectation of a "correct" set of search results is unavailable, the system and method according to the present invention allows the user to tune the search in a new manner, based on the set theory paradigm. In some instances, the result itself may differ from the results available through known searching strategies from existing systems. The present invention provides a set of graphic tools and manipulable icons to provide a graphic correspondence between the manipulation of the graphic elements of the user interface by the user and the change in search scope and/or results presentation strategy defined by the interface.

Often, a broad search seeks set members which correspond to a concept, the search strategy being used to define the concept. These concepts may be unitary and indivisible, or complex and multifactorial. Therefore, real world searching often requires surrogate criteria, estimations, cutoffs and simplifying assumptions. Where a concept is clearly definable and the data readily analyzed to determine a match to the concept, the definition of this set is clear, and no manipulation is necessary. On the other hand, the surrogate criteria, estimations, cutoffs and simplifying assumptions often lead to errors, i.e., loss of significant set members or inclusion or erroneous set members, or both. In a typical search strategy, it is often desired that the initial search criteria be overinclusive, so that later the search may be narrowed in specific ways. Thus, the surrogate criteria, estimations, cutoffs and simplifying assumptions should generally be defined so as to over-encompass the desired data. Sometimes, multiple underinclusive set definitions are used to define the concept, either because the search tools do not allow a single criterion of sufficient breadth, or because such a single criterion would result in the inclusion of a high proportion of undesired set elements without a corresponding increase in desired set elements.

For each set definition which employs surrogate criteria, estimations, cutoffs and simplifying assumptions, it therefore may be desired to be able to tune the set inclusion properties and/or rank the set membership. One way to do this, for example with full text string searching, is with proximity operators. For numeric data, intervals, ranges and statistical functions may be employed. For other types of data, other criteria may be employed, as appropriate for that type of data. The result of the identification of a continuous or stepwise continuous parameter which has a presumed or defined relationship with the concept is that the set inclusion criteria may be modified in a desired manner by altering this parameter. In any given case, one or more parameters may be appropriate. In a single parameter system, it is believed that a single axis may be used to define more inclusiveness and less inclusiveness, with additional axes required for additional criteria. Thus, for a single set inclusion property, a circle with a radius may be graphically presented to the user. The user manipulates the set inclusion criteria by relatively varying the radius; an increase in radius broadening the search and a narrowing of the radius closing the search. Of course, a line, polygon, or other graphic indicia may be used instead of a circle. In fact, where multiple criteria are employed, multiple axes may be presented, such as in a star graph. Alternately, a set of visual slide controls, analogous to the board of a mixing preamplifier, may be used to control multi-valued variables, while on-off toggles may be used to control binary variables.

In general, it is useful to provide default operators which represent a most likely or best choice for a user. Thus, for each user action, the system preferably provides a default which may be predetermined or adaptive, and which may differ for each user action. Typically, the default operations may be accepted by the user with a minimum of action, while an override is available which may require further keystrokes or pointer activity.

In order to gesture to the interface an intent to tune a set inclusion property, the particular set is selected, and then the gesture made. Thus, since each input set is signified by a bounded region in a Venn diagram, the border of the bounded region may be enlarged or contracted to alter the set inclusion property. Further, any region or regions may be selected for attempted manipulation, including the region outside the defined set spaces, the intersection and non-overlapping portion of each set. Likewise, the ranking of the each region in the Venn diagram, or composite regions, may be ranked. The gesture may also pertain to a relation between two sets, such as a Boolean relationship or a change in a parameter. Therefore, not only may the size of a region be manipulated, but also the relative spacing and arrangement of the spaces.

Implicit in certain of the modifications discussed herein is that the user is provided with feedback as to the effect or expected effect of a particular modification. In this case, any of the known metric indicators may be employed to indicate to the user the number of elements in the selected set. For example, a digital indicator, linear gauge, size of a bounded region, color, color density, or other known indicator scheme may be used. Thus, the user graphically manipulates the icon until a desired metric is achieved or is expected to be achieved. While a user might also directly indicate the desired metric, often, the data does not have a linear distribution or other simple distribution. In this case, the user can "tweak" the set inclusion property until a desired portion of the set is encompassed. Further, the system, in addition to presenting a membership metric of a desired set inclusivity, may also present a membership metric of an undesired set inclusivity, allowing the user to define a desired "signal to noise ratio". In these cases, merely entering a desired size of a set has the same narrowing effect as defining a ranking criterion and setting a threshold cutoff of the ranked set; the rules for such a narrowing may be explicit or implicit and predetermined or learned.

The user may modify the graphical representation by changing a size, shape, position, color, texture, sound or other characteristics of the represented data set. This change is then reflected by performing a set operation on the data set in the data space which corresponds to the manipulation. Preferably, a metric indicating the effect of the proposed change is outputted, but in some cases, the search result itself may be presented.

In a Venn diagram representation, a boundary represents the set inclusion property limitation, and thus data elements which meet the set inclusion property are within the bounded area and data elements which do not meet the set inclusion criteria are outside the bounded area. In general, the position and the shape of the area and boundary will be arbitrary, but in certain instances, the data space is ordered and the set inclusion criteria define a data set with a "shape" within the data space. Where two data sets are defined within the data space, elements common to both sets will be in an overlapping area bounded by both boundaries; there may be data elements bounded by one or the other boundaries, and there may be data elements bounded by neither boundary. Where the data sets are drawn from different data spaces, the representation may be different, although in most instances the desired representation by user will be the sum of both data spaces as the presented composite data space.

For example, set A may be defined is word X within n words of word Y in a fill text database search. The initial search may be performed with n=10. In this case, a change in size of the boundary may be interpreted as changing n, so that a larger boundary increases n while a smaller boundary decreases n. The number of set elements which meet the set inclusion criteria may be indicated graphically or numerically, to allow feedback as to the effect of the modification. In like manner, a multidimensional change in size or metric (e.g., shape) may be implemented where the set inclusion criteria are more complex. On the other hand, where two sets, A and B, are defined, their spatial relationship in the graphic representation may be interpreted as their degree of overlap. By changing the spatial relationship of the representations of set A and B, the set inclusion criteria for the underlying sets as well as their union and intersection may be controlled. In some instances, this is impossible, for example where the represented set inclusion criteria do not include any continuous or stepwise continuous formulation. In this case, the user interface rejects an attempt to graphically modify the configuration of the graph, and a form or error message indicated to the user. For such a change to be made, the user must alter the underlying concrete set inclusion criteria or define a subsidiary ranking method. On the other hand, the overlap between two sets may have an element of gradation, and therefore the positional manipulation would be interpreted as changing a threshold, ranking criterion, set inclusion property, or another aspect, as possible given the underlying set inclusion properties.

Where a number of possible interpretations of a manipulation are possible, the interface may guess the most appropriate interpretation or seek elucidation from the user. Thus, the user may enter set inclusion criteria which result in 100 "hits" or data records or portions of records which correspond to the criteria. The user, however, may seek an output including only 50 such hits. Therefore, the user selects the bounded region of the GUI which corresponds to the desired hits, and graphically seeks to resize the area. Where the search criterion includes a single continuous or stepwise continuous parameter, the interface may interpret the resizing as a command to vary this parameter. Where the resulting data set is ranked, i.e., where there is an algorithm for determining the relevance or importance of elements which meet the set inclusion property, the resizing may also be used to vary a threshold, below which the data is not considered within the boundary. Where there are a number of possible analogies to the resizing, the interface may seek specific guidance from the user, have different resizing commands, employ a multidimensional resizing command, with the various dimensions representing the various degrees of freedom to modify the set inclusion properties, or the interface may guess the correct interpretation, using a set of artificial intelligence rules, an adaptive interface, or contextual analysis of the data sets or data space. The interface may present the user with a dialog box to receive specific guidance. Of course, a combination of these strategies may also be used.

Another aspect of the present invention provides a ranking algorithm based on an extrinsic database, such as a known citation index, such as the Science Citation Index or Social Science Index, which includes major scholarly references, with indication of the identity of the authors, affiliated institution, journal, cited references, title, and possibly abstract and key words. Such an index, when employed to rank the relevance or importance of the results of a search in another database, provides a sophisticated means for evaluating references. Typically, a search of various topics will yield hundreds or thousands of "hits". In this case, it is desired to present the "hits" to a logical order, so that relevance or importance declines as the list is reviewed in order, allowing a truncation of review of the search results without reviewing all of the references and allowing a cutoff to be less arbitrarily imposed. Thus, for example, if literature review references are desired, the sort or rank criterion is number of cited references. If scientific importance is desired, then the number of citations to that reference is the sort or rank criterion. Other criteria which may be employed include the importance of the journal, which may be defined by the user or derived from a statistical analysis of the citation database itself, the importance of the institution(s) with which the authors are affiliated, the number of cites to articles by an author, the relationship between a number of authorities referred to or instances of citation by an author and the number of authorities referring to the author or instances of citation to that author, or any other single criterion or hybrid of multiple criteria.

In addition to citation indexes, a number of other extrinsic knowledge sources are available for ranking of data sets. For example, as appropriate, electronic dictionaries, encyclopedias and reference works, may be used for ranking electronic data. Internet or other electronic catalogs, news reports, wire news feeds, historical (including natural history) materials also provide useful sources of ranking information. In particular instances, business data and data mining systems may be used, for example retrieving business inventory, orders, operational processes, personnel, performance, commissions or royalty information. In searches relating to intellectual property, patent, trademark, copyright, other legal or technical information databases may be used. Likewise, information on agriculture, veterinary science, animal husbandry, lineage (documents), bloodlines or breeding, physical performance, etc. may be used to rank information relating to these areas. In fact, such ranking need not be semantic in nature, and various types of correlation to image, sound or other data may be used where appropriate. News reports, biographical information, and news pictures may be used to relation to persons and events. Archives of musical, architectural, artistic or theatrical material, or other materials of the creative arts may also include information useful for data ranking. Statistical, demographic, actuarial, geographic, cartographic, census, or projections of future numbers may be used for ranking in some cases. Recipes, formulas, and chemical or industrial process information are other types of information sources. Thus, it is apparent that, according to the present invention, data may be ranked in accordance with a relation with information in a separate data base, which provides a standard of relevance. The ranking database and method of ranking may be automatically selected based on availability and data type or semantic terms, or manually selected by the user.

The invention also contemplates the use of "blockmodelling" (or similar technique) to establish hierarchies and represent them visually. See, Harrison C. White et al., American Journal of Sociology, Vol 81(4), pp. 730-780 (1993), expressly incorporated herein by reference. Although these blockmodelling techniques are known, their application to GUIs, data browsers and database search engines, as an automated tool to establish apparent relevance or authority, is not known. Blockmodelling is defined herein as any technique that uses an algorithm to establish ordered matrices of the relations (such as "like/neutral/dislike" or "A knows B, B doesn't know A; A doesn't know B, B knows A; A and B know each other, A and B do not know each other") among social objects (such as publications). Such a technique can be used to establish, probabalistically, who are the members of a scholarly specialty, and who has the most apparent "authority" within the specialty, based on the relations of citation.

Thus, while such systems have certain limitations, they provide additional tools and opportunities for ranking of references. The use of citation indexes is especially useful because databases of such information are available on-line and on CD-ROMs, making implementation possible without having to amass this data separately for implementation of the interface system.

Likewise, where relevant, Internet Usenet postings provide similar opportunities, such as by employing "DejaNews" (http://www.dejanews.com), "Alta Vista" (http://www.altavista.digital.com) or other search engines which allows a search for all posts by an author. In this case, institution information may be less reliable however, domain name may be useful information. Further, the "citations" of the citation indices on the Internet Usenet correspond to the posting threads, which allow related postings to be grouped together. Of course, other types of mass indexed databases may be used to rank the set outputs, where the set space has a significant relation to the database from which the index is created.

While for many envisioned set definitions, a Venn diagram, defining Boolean logic spaces is sufficient, in other cases, other data relationships may be desired or required. Thus, alternate or additional symbols may be employed. For example, a time delay or relative time difference may be represented by a clock in a box-icon; exclusive or (XOR) represented by two circles with one or two lines separating them, in a rectangular box; stop indicated by an open hand pointing up, "go forward" and "go backward" indicated by a hand pointing to the left or to the right, respectively, and a merger or mixing represented by a funnel.

More generally, the BGI is well suited for integration with other pictographic symbols that are intuitively clear, such that the GUI is readily understood and remembered by users, regardless of natural language, and without extensive practice or training. For example, in chemistry, the addition of liquid could be represented by a funnel; in electronics, a step-up transformer could be represented by a set of stairs going upward from left to right; in cooking, a straining process by a strainer.

OBJECTS OF THE INVENTION

It is therefore an object of the invention to provide a graphic interface method for manipulation of data sets in a database, comprising the steps of defining at least two sets having distinct set inclusion criteria; representing the at least two sets as a graphic image of at least two regions in a space having a spatial relation, representing a composite set inclusion criterion; receiving a user input for manipulating a configuration of the graphic image, altering at least one of a size, shape and position of at least one element of the graphic image; and translating the manipulation of configuration as a modified composite set inclusion criterion. A database operation may then be executed corresponding to the modified composite set inclusion criterion.

It is another object to provide a graphic interface system for manipulation by a user of data sets in a database, comprising a graphic output; a user input having at least one substantially continuous degree of freedom corresponding to said graphic output; a processor, for receiving the user input and generating the graphic output; and a database, comprising a plurality of data records each having at least two characteristics, the processor receiving at least two set inclusion criteria from the user; representing in the graphic output the two set inclusion criteria as a graphic image of at least two regions having a spatial relation in a space, corresponding to a composite set inclusion criteria; receiving the user input for manipulating a configuration of the graphic image, altering at least one of a size, shape and position of at least one element of the graphic image, the set inclusion criteria, for each manipulation, corresponding to the degrees of freedom; and translating the manipulation of configuration as a modified composite set inclusion criterion.

It is a further object of the invention to provide a GUI method for representing a search of a database, comprising the steps of defining a generic graphic icon having a boundary and two intersecting areas in the boundary, each area representing a data set, an intersecting portion of the areas representing a conjunction of the data sets, and having four discrete regions, the portion outside the union of the areas, an intersecting portion of the areas, and portions within one area and not within the other area; receiving from the user a selection of one or more regions within the boundary to define an output data set and presenting the generic graphic icon on the GUI as a first modified graphic icon, having visual indication of the selected regions corresponding to the defined output set; defining a set inclusion property to correspond to each data set for the first modified graphic icon; receiving from the user a selection of one or more regions within the boundary to define an output data set and presenting the generic graphic icon on the GUI as a second modified graphic icon, having visual indication of the selected regions corresponding to the defined output set; defining a set inclusion property to correspond to each data set for the second modified graphic icon, one of the set inclusion properties of the second modified graphic icon being the defined output set of the first modified graphic icon; outputting the first and second modified graphic icons together on the GUI to represent the composite set inclusion properties of the selected regions of the second graphic icon.

Another object of the present invention is to provide a method for manipulating data sets in a data space, comprising the steps of providing a GUI of a computer system; defining at least two data sets in the data space, each of said data sets being represented by a primary graphic object presented on said GUI; and manually altering a spatial relationship of said primary graphic objects through said GUI, to modify a secondary graphic object representing a result of a set operation on said data sets represented by said primary graphic objects, the graphic structures and the secondary graphic objects each defining bounded regions selectable through the GUI.

Further objects of the invention are to provide a Boolean graphical interface ("BGI") system as a "front end" for searching mass databases, having one or more of the following features:

a. Boolean logical connectors, such as AND, OR, and NOT, represented graphically by "Boole-graphs", including Venn diagrams, histograms, circle graphs, time lines, clocks, geographical maps, graphical representations of AxBx . . . N matrices and tree structures.

b. Graphical representation of the entire search, with saved intermediate results, allowing the user to move backward and forward through the Boole-graphs without any loss of information or need to perform a new search.

c. use of typical GUI gestures to interact with the system, such as point and click, drag, etc., to program the search strategy, while maintaining intermediate search results. Within graphic representations, an outlined section of a Boole-Graph may be selected as a domain for a further search or dragged together with or separated from other outlined portions.

d. an indication of an output metric is provided which is preferably analog, and may be non-visual, such as aural or textural. The set inclusion functions are preferably indicated graphically.

According to another object of the invention, the methods are embodied in a computer program wherein the BGI system is implemented as an "applet" or module that can be filly or partially downloaded from a computer network such as the Internet, for use by many different computer platforms, to the extent that the applet is compiled in a common code that these platforms are enabled to interpret or execute. Such applets may be provided as JAVA or ActiveX constructs. The BGI may be attached to a browser and/or search engine facility, or can be so attached, so that the parts work as an integral unit.

According to a further object of the invention, the BGI system is capable of displaying graphically the work of an "intelligent agent" residing either in the BGI or elsewhere. For example, to periodically update a search and show "before" and "after" Boole-graphs. Or to show Boole-graphs representing the empirical results of two different negotiating styles followed by the intelligent agent.

According to a still further object of the invention, the BGI system has a interface that is optionally adaptive, that is, the user can choose to allow the computer, either always or in certain instances, to make conclusions about a suitable appearance or functionality of the interface, based on inferences about some or all activity of the user. The adaptivity may be controlled using graphical set representations according to the present invention.

According to an additional object of the invention, the BGI system allows the user to interact with multiple databases and/or search engines simultaneously, where each separate search is capable of being displayed by a separate Boole-graph, and where the elements of each Boole-graph can be dragged to separate Boole-graphs, for example, to test cross-intersections.

According to another object of the invention, the BGI system displays especially pertinent forms of the BGI, for example as chosen from icons, so that improved efficiency in user interaction is gained. For example, special BGI optional environments for travel reservations, concert bookings, employer or employee wanted, searching for a qualified professional, other human resources functions, match-making, indexing and tables of contents, self-guided learning, scheduling, shopping, navigating, web browsing, the various scientific disciplines, such as chemistry, physics, biology, electronics, mechanics, etc., cooking, and other common or specialized activities.

According to a still further object of the invention, the system includes the ability to search databases which include not only textual information, but also other information forms, such as auditory, visual, olfactory, or textural or touch inputs, and combinations thereof.

These and other objects and features of the present invention will become more fully apparent from the following description and appended claims taken in conjunction with the accompanying drawings, in which like numerals refer to like parts.

BRIEF DESCRIPTION OF THE DRAWINGS

FIG. 1A is a comparative chart of various forms of logical notation, including a set of logical notation symbols according to the present invention;

FIG. 1B is a chart of sample pictographic symbols or icons according to the present invention;

FIG. 1C illustrates the interaction of the icons;

FIG. 2A is a table according to the prior art;

DETAILED DESCRIPTION OF THE PREFERRED EMBODIMENTS

Figure 1D:
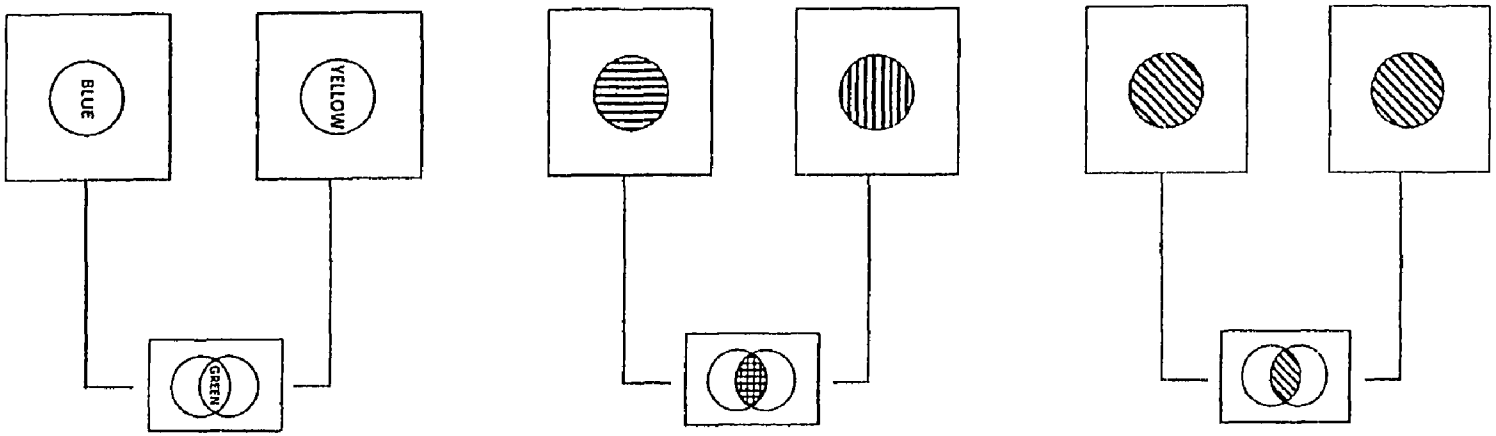
FIG. 1D illustrates some possible ways to signify the presence of set elements within a region.

The invention will now be described by way of the drawings, in which corresponding reference numerals indicate corresponding structures in the figures.

As shown in FIGS. 1A-D, there are various symbolic notations for logical functions. A preferred notation according to the present invention is a Venn diagram, column E, of FIG. 1A which in compact and standardized form provides an intuitive representation of the various relationships between two data sets.

Figure 2B:
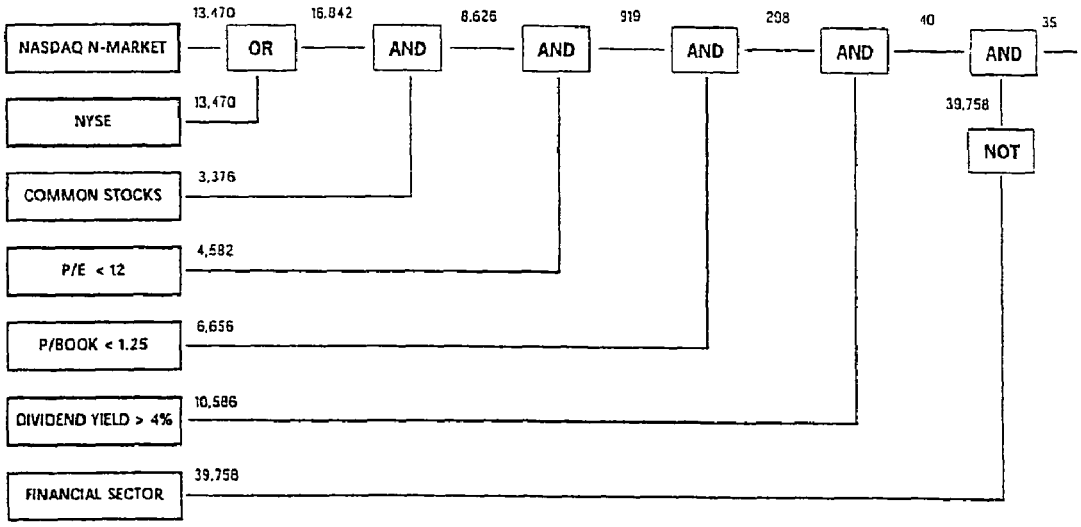
FIG. 2B is a logic representation diagram which extends the prior art.
Figure 3A:
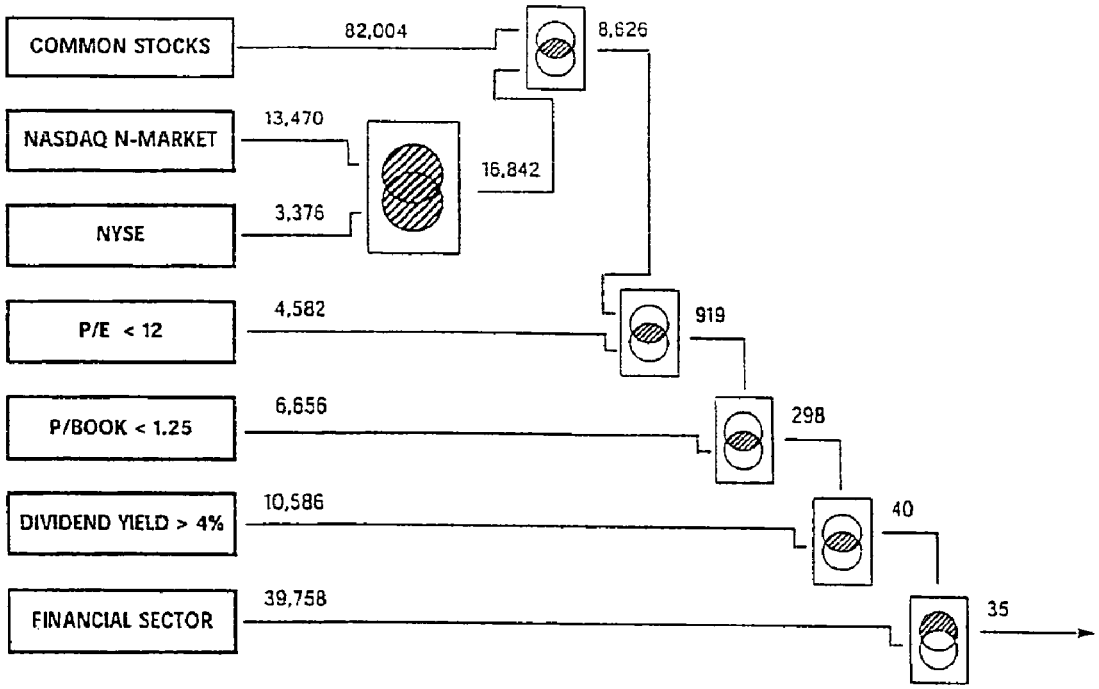
FIGS. 3A and 3B are alternate graphic search representations according to the present invention, employing Venn logic diagram notation of the search represented in FIGS. 2A and 2B.
Figure 3B:
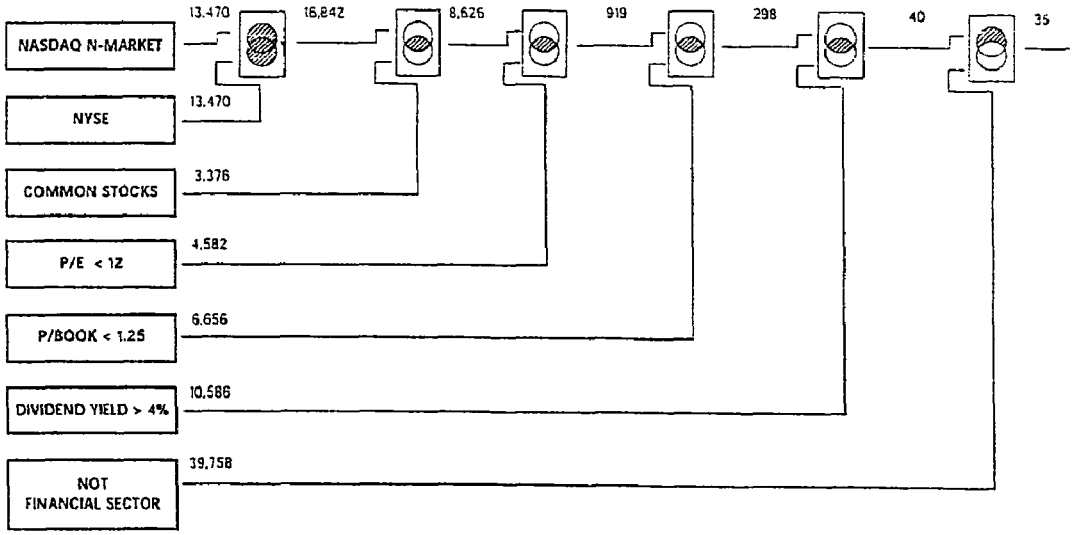
Figure 4:
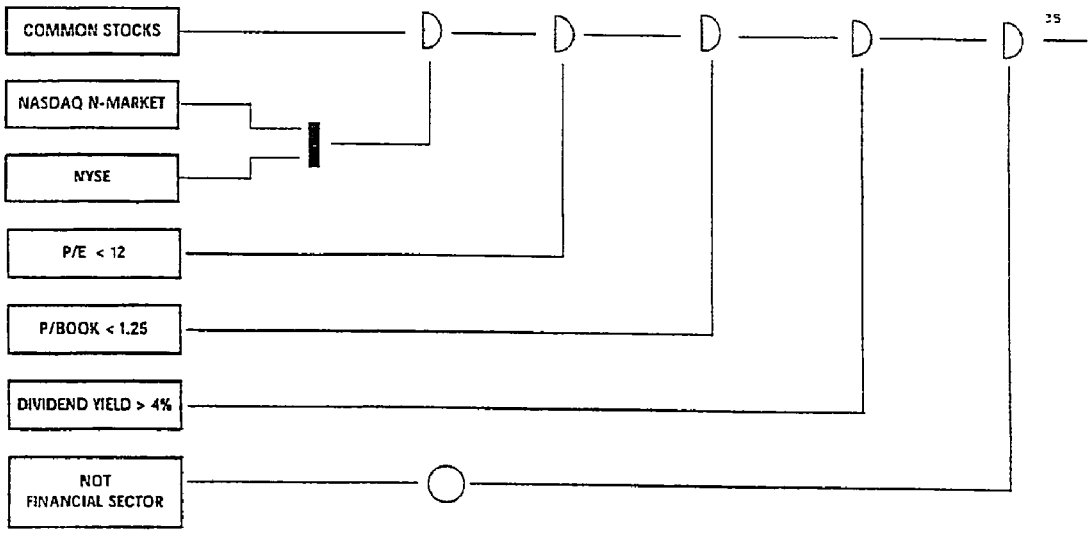
FIG. 4 is a conventional logic notation diagram of the search represented in FIG. 2.

As shown in FIGS. 2A and 2B, conventional notation requires careful study of the words or translation of the symbols into set relationships for comprehension of the symbolic notation. Where words are employed, the efficiencies of a symbolic representation are lost, and complex expressions are difficult to comprehend On the other hand, FIGS. 3A-B provide a clear representation of the set relationships of each graphic icon or symbol as a set operator, according to the present invention. This is because the symbolic notation includes intuitive graphic clues as to the set relationships indicated by the symbol. Further, because all of the binary Boolean logical relationships may be represented by a single icon, the present invention has the potential for greater efficiency than other schemes which have a more limited number of symbols or require elaboration of large sets of discrete symbols. As shown in FIG. 1C, these symbols or icons can be made to interact with each other through the use of graphic logical connectors.

Optionally, available to the user is a diagrammatic form of Boole Logic, as shown in Column F. As shown in FIG. 1B, the logical symbols of the invention are accompanied by a range of pictographic symbols, depicting actions, choices, processes, results and warnings, all universally understandable.

EXAMPLE 1

Figure 5A:
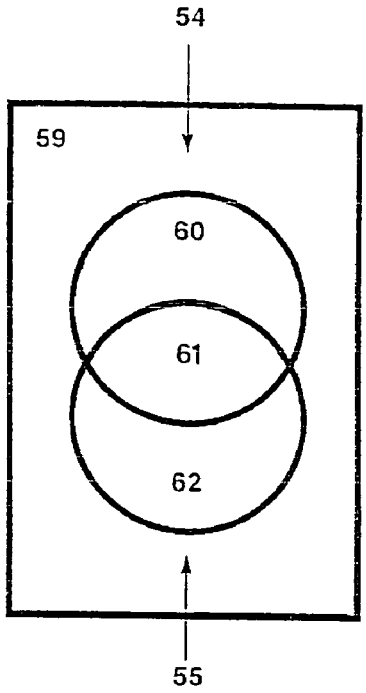
FIGS. 5A and 5B represent elementary iconic symbols of the Boolean Graphic Interface according to the present invention, having two and four inputs, respectively.

As shown in FIG. 5A, the graphic icon representation according to a first preferred embodiment of the invention provides an intuitive presentation of the Boolean relationship of two sets, in the form of a stylized Venn diagram. The stylized icon includes a bounding rectangular box 51, two intersecting circles 52, 53 of approximately equal size spaced along the elongated axis of the rectangular boundary 51, and lines representing the two inputs 54, 55 and output 56 of the set operation.

As shown in FIG. 5A, arrowheads may be provided to indicate inputs and outputs; however, these are not necessary, and in fact, a modification of a succeeding search scope parameter effecting another set inclusion property may back propagate to alter that linked set inclusion property. Thus, the lines indicate linkages, and do not necessarily indicate a unidirectional information or control flow.

Figure 5B:
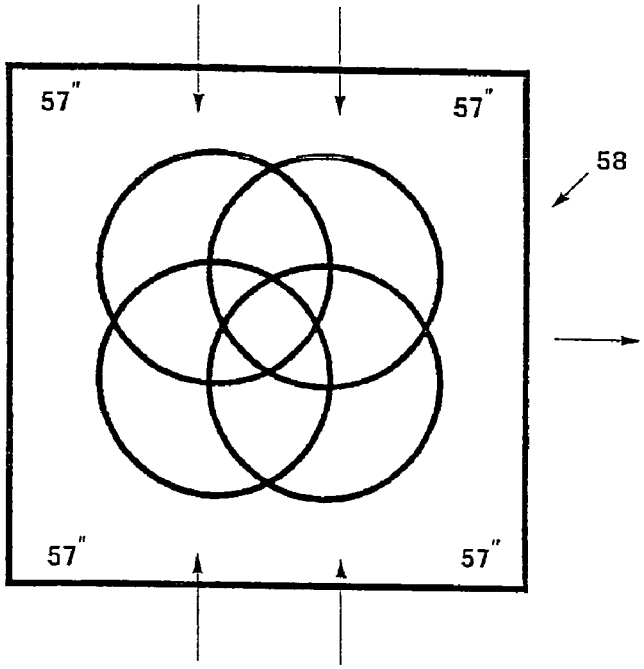

The icon defines logical data regions representing a Boolean relationship between two data sets. Of course, more complex data relationships may be graphically indicated in a single step, as shown in FIG. 5B, which includes four intersecting circles 57', 57", 57'" and 57"" within rectangular boundary 58, but these are not preferred for general purposes, and are preferably only used where a large number of sets are combined using a relatively simple operation, such as AND or OR.

Figure 7:
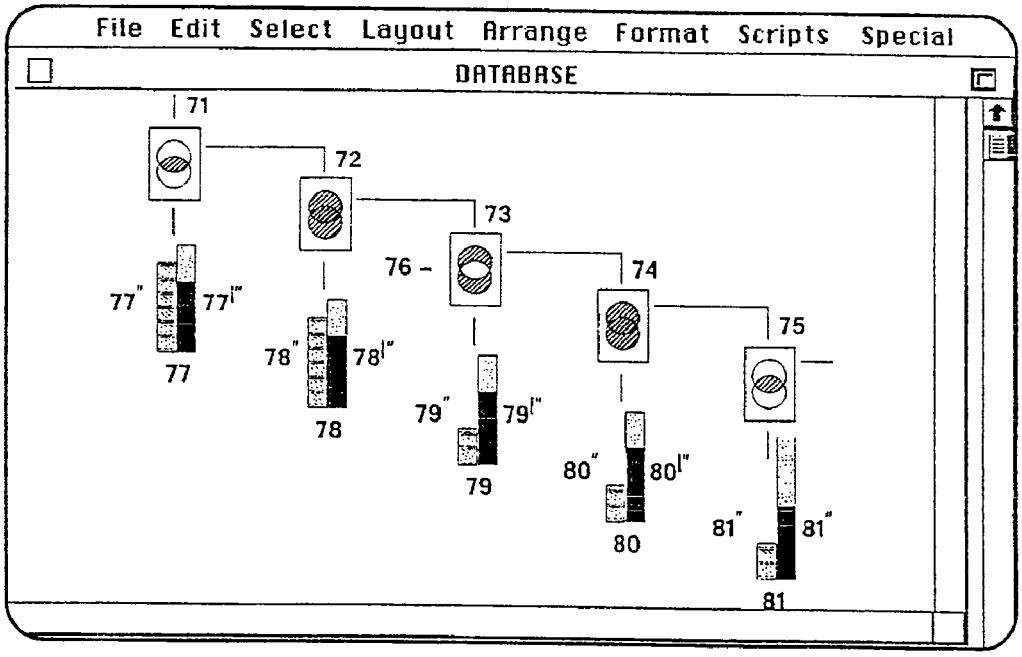
FIG. 7 shows an user interface screen according to the present invention showing a multi-criteria search and graphic indicators of search results.

FIG. 7 shows a computer interface of a computer employing the graphic icons, for performing a complex search. In this case, the search is a chain of five binary criteria 71, 72, 73, 74, 75, with 6 input sets. A pointer 76 is shown proximate to one of the icons 73, which, for example is used to select a region within the icon, manipulate a size or position of an icon, to select for analysis such as ranking, sorting or blockmodelling, or to position the icon itself Below each icon in FIG. 7 is a pair of bar graphs 77, 78, 79, 80, 81. A first bar graph 77', 78', 79, 80', 81'represents a number of set members which match the indicated inclusion criteria, while a second bar graph 77", 78", 79", 80" 81" indicates a ratio of desired set members which meet an additional criterion to set members which do not meet the additional criteria.

Figure 9:
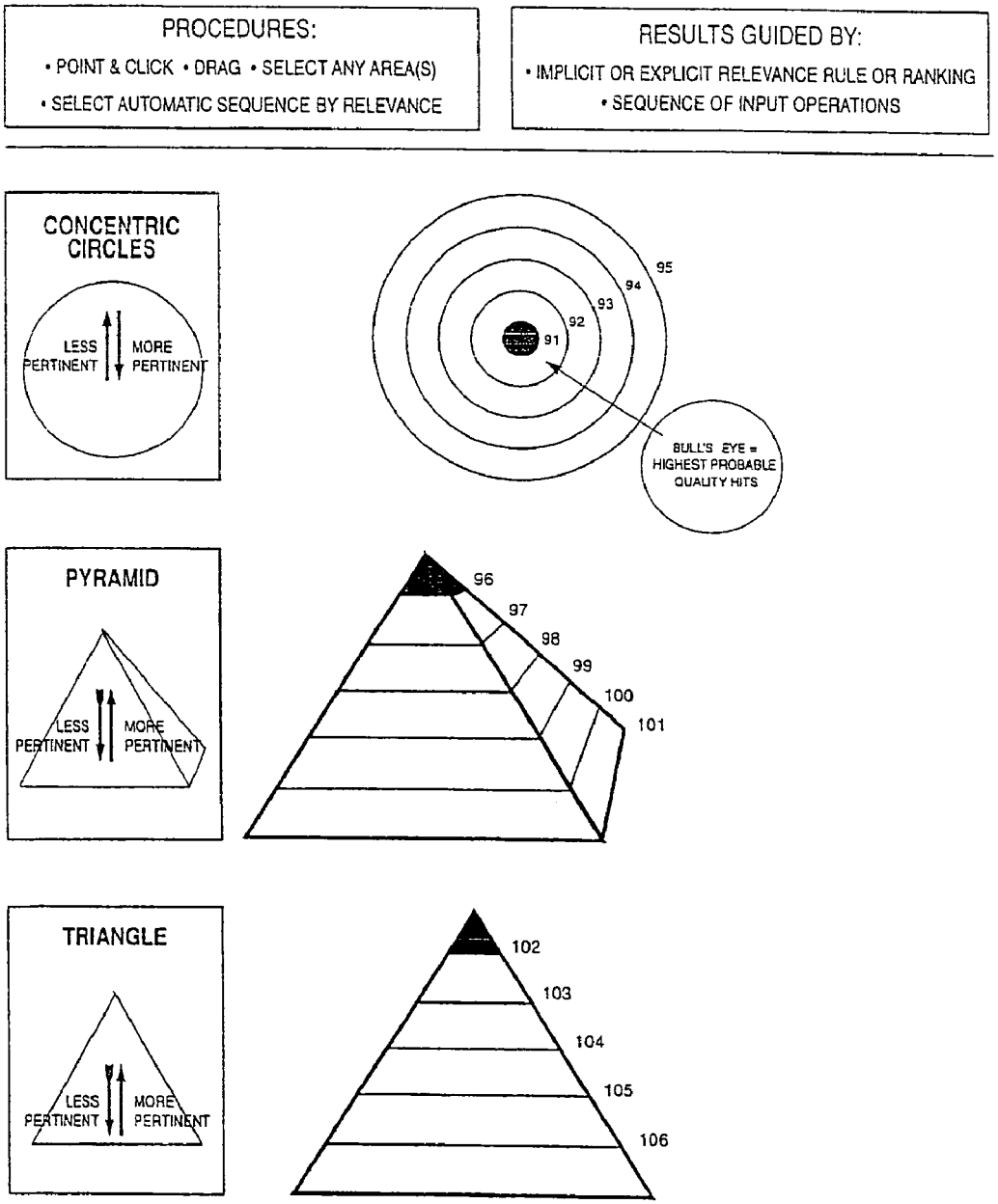
FIG. 9 shows different icons for displaying ranked outputs according to the present invention.

In another aspect of the invention, flexible output icons are employed to represent results ranked as to probable relevance, as shown in FIG. 9. These icons may represent a data filter for ordering or ranking the data according to a desired characteristic and possibly apply a threshold or cutoff. The flexible output icons may use, for example, either of the two visual representations of the relevance of "hits" shown in FIG. 9: concentric circles 91, 92, 93, 94, 95, or layers of a pyramid 96, 97, 98, 99, 100, 101 or triangle 102, 103, 104, 105, 106. In the case of concentric circles, the innermost circles 91, 92 would be defined to have the greatest probable relevance. Similarly, the apex of a triangle 102, 103 or pyramid 96, 97 would be defined to have the greatest probable relevance. In each case, the GUI would allow the user to point to and click on any ring or slice, or to drag together (define as active) two or more sections. According to one embodiment, the user would have single step availability of functions to see all results or to view each successive layer of results, simply by touching one key or switch or via a single pointing device command, the result layers being ordered by a sequence of decreasing or increasing relevance. The rules guiding selection of a ranking may be explicitly given by the user or instead, given by the computer, or based on experience, artificial intelligence, or adaptation of the computer to the user's preferences.

Figure 10:
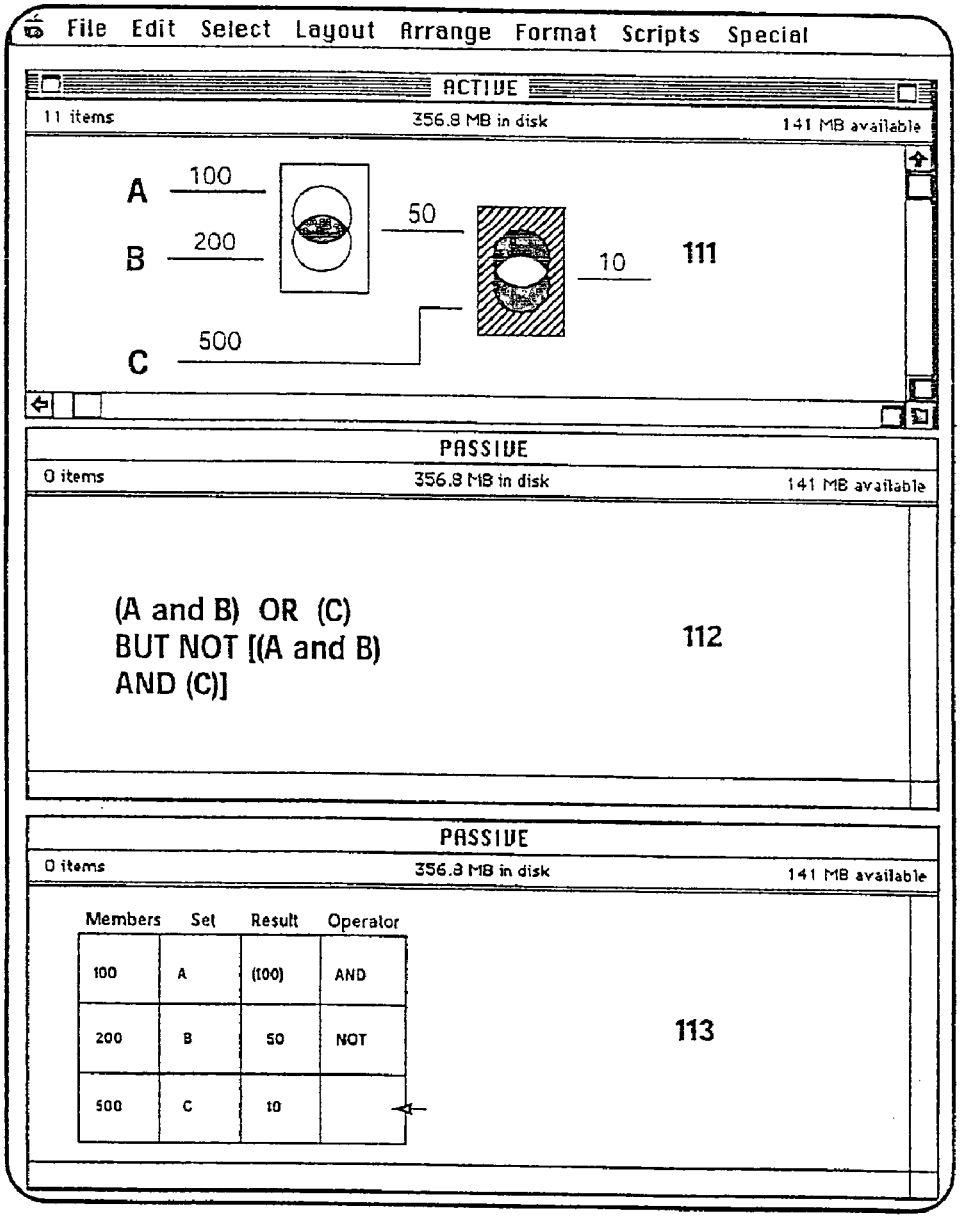
FIG. 10 shows a computer display screen having a split screen showing Boolean graphic notation, conventional Boolean notation of a set inclusion criterion according to the present invention and a tabular format.

Because the present invention provides for a formalized notation that can be made to correspond on a one-to-one basis to the prior art, translation to and from the notational system according to the present invention may be provided, and a representation in one form may also be represented in the other form as a function of the system according to the present invention. An embodiment of such a translation mechanism, shown in FIG. 10, provides a split screen or multiple window display 110 with simultaneous representation of the Boolean Graphic Interface 111 according to the present invention and an equivalent traditional Boolean notation 112 of the same scope. A change or input in one window 111, 112 would be propagated to the other 112, 111, allowing the user to use either interface, or both, for input. FIG. 10 also shows an optional, enhanced tabular format 113 of traditional Boolean notation according to the present invention. This immediate translation allows use of the interface for database systems which accept only traditional Boolean notation 112 inputs. By moving a pointing device, such as a mouse, or touch screen, any part of the interface may be selectively made active for receiving input, as desired.

To construct a search, a user selects an icon, which may be a generic icon which is "programmed" with the desired characteristics, or a predetermined icon having commonly selected characteristics. In this manner, entire predetermined search strategies may be iconized and employed in subsequent searches. In the case of a generic icon, the inputs are then defined. In many cases, this task is most expeditiously performed as a manual set definition in known manner, i.e., the user types set inclusion criteria into a text dialog box, and presses enter, for each of the inputs. The user then selects the desired output function as a relation between the inputs, for example by defining a Boolean relationship between the sets. While this step may also be manually performed, the pointer of the interface may be used to select regions of the icon representative of the desired set spaces. The output may be further used as an input to another operation.

In order to tune the search operation, a number of options are available. The interface optionally provides an indicator of the size and ratios of the resultant sets. As shown in FIG. 7, these may be presented as bar graphs 77, 78, 79, 80, 81. Where the number of elements of the set is different from the user's expectations, this may be changed in a number of ways. First, the input set definitions may be broadened or narrowed to include more or fewer elements. This change may be performed manually, by changing the set inclusion criteria, or through an artificial intelligence or semiautomated means. In an artificial intelligence scheme, the computer system analyzes the set inclusion properties and, based on rules, neural networks, or fuzzy logic, proposes a change to the set inclusion properties which would likely have the desired effect. Where the database is readily accessible with small penalty, an artificial intelligence system may be used to probe the database with one or a series of changes to determine the effect. In this way, both the specific change type and amount may be analyzed. Thus, the user, in this case, instructs the artificial intelligence system of whether the set inclusion criteria are too broad or too restrictive, and the system thereafter analyzes the search strategy and proposes a change. In a semiautomated system, the interface applies far less intelligence to assisting the user, and therefore allows the user a finer granularity of control. In this case, a selectable criterion for altering the act inclusion is defined, or selected by default. For example, a proximity operator between terms or a numeric interval defined. Thus, the user manipulates an icon to indicate a relative change in this operator or interval, and the set inclusion criterion is correspondingly updated.

A second way to narrow a set is to rank the members and apply a threshold or cutoff based on the ranking. Often, the racking criterion is related to the set inclusion criterion, but need not be so. Where a set inclusion criterion is defined by other defined sets, these rankings may be applied to these sets before a subsequent set operation, and the ranking criterion may include the set inclusion criterion from the antecedent set definitions. On the other hand, the rankings may also be applied after the composite set operations or using extrinsic criteria.

To broaden a search, for example a text-based search, a thesaurus may be applied to include words having similar meanings to the search terms. Further, spelling variations and word root analysis may be used to identify variants.

A third way to narrow a set is a apply additional criteria, such as additional composite set functions.

This search scope alteration process may be applied to any set definition, individual or composite. Thus, within an icon, the scope of any region may be modified. Where the region corresponds to a defined set, preferably any change in set properties is propagated back to the earlier set definition. However, this back pro propagation may be undesired where a given set output is applied to multiple inputs, and where a change for one subsequent operation is not necessarily desired for another subsequent operation.

Figure 6:
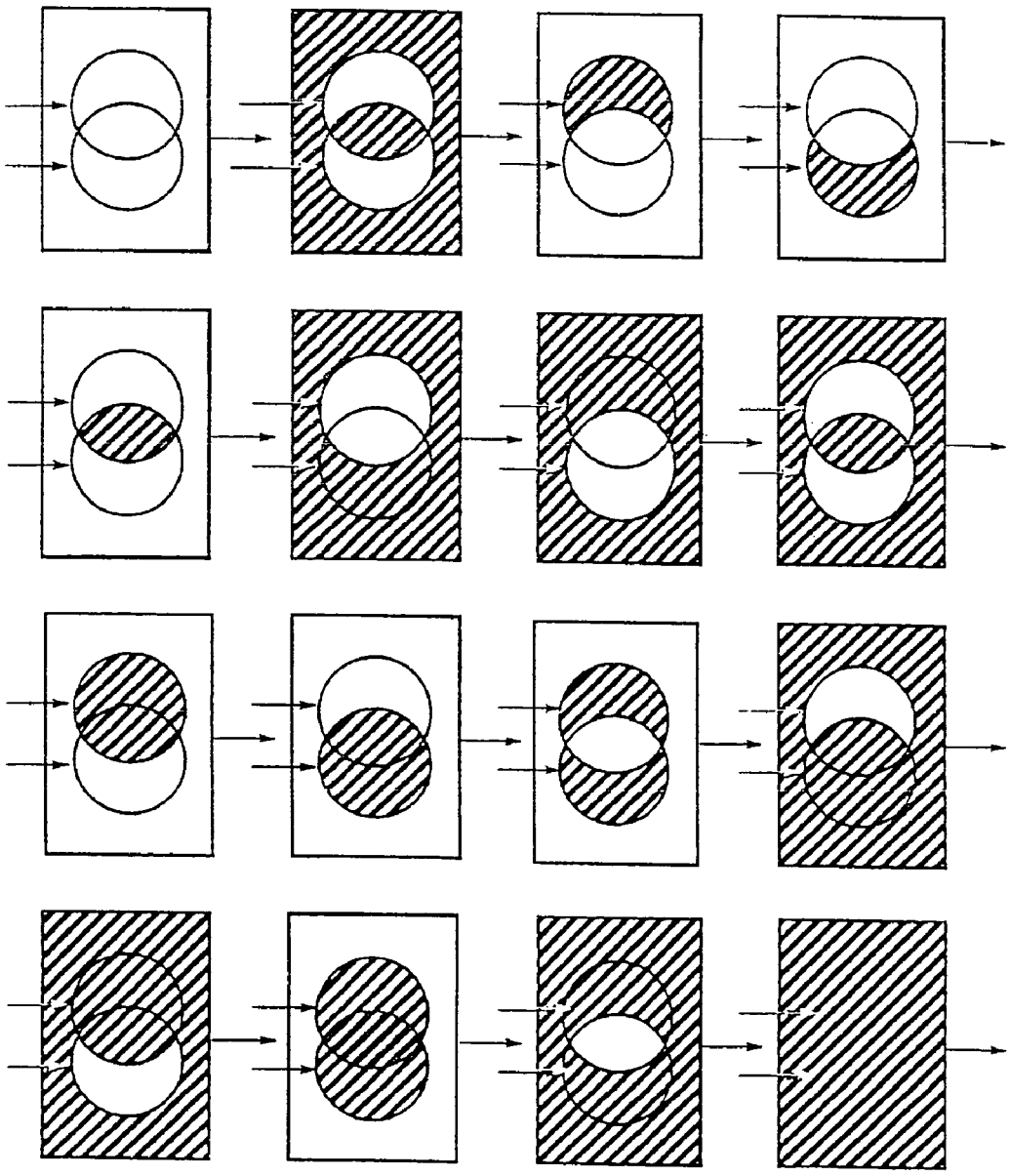
FIG. 6 shows various alternative representations according to the present invention differentiated by their logical symbolism.

The preferred icon, as shown in FIG. 5A, is a generic Venn operator icon, divided into 4 set spaces 59, 60, 61, 62, with two intersecting circles 52, 53 in a rectangular box 51. The space within each circle and not intersecting 60, 62 defining two set spaces, the intersection 61 defining a third set space, and the external area 59 defining a fourth set space. These set spaces, are independently selectable, allowing definition of the various Boolean binary operators of the elements of sets, as shown in FIG. 6:

null set
A NOT B
B NOT A
NOT (A OR B)
A AND B
A
B
NOT A
NOT B
A XOR B
NOT (A XOR B)
A OR NOT (A OR B)
B OR NOT (A OR B)
NOT (A AND B)
A OR B
A OR NOT A A selection is thus received from the user of one or more regions within the boundary to define an output data set and presenting the generic graphic icon on the GUI as a first modified graphic icon, hiving visual indication of the selected regions corresponding to the defined output set. In addition, as discussed above, a set inclusion property is defined to correspond to each data set for the first modified graphic icon. Where a generic icon is not employed, to be modified by the user, an icon representing a set having predetermined characteristics may be selected from a pick list or tool bar. These predetermined icons may provide advanced functionality, not easily available in the generic icon interface, such as chronological functions, custom database interfaces, and the like. The predetermined icons may be user modifiable.

Where a user selects a Boolean function by selecting regions of an icon, those regions may change color or image density.

After the individual input sets are defined, and an output relation of the sets defined, the output may be suitable for review by the user as an input set to another search criterion. The icons are chained together as elements in a flow chart, by graphic connector lines which connect the inputs and outputs of the iconic representations. These connector lines may be smart, i.e., intelligently routed, spaced and sized in accordance with the overall search strategy, graphic presentation and page or presentation layout.

Generally, the entire search sequence will be maintained during the session, so that the user may review various inputs and outputs and revert to prior states if this is preferred to a subsequent state. Thus, the user may be able to test conditions of the data or search refinements without losing valuable intermediate results.

Where a variable operator in the set inclusion criteria is identifiable, this provides the opportunity to alter the scope of the set, by simply varying this operator. Where numeric data is used, this operator may be a threshold or range in which the set members reside, and thus the set composition may be varied by simply changing the cutoff or range. Thus, as shown in FIG. 8A(1), an icon may be provided with a simple numeric indicator 84 representative of the parameter, allowing simple graphic manipulation by selecting an up arrow 85 or a down arrow 86, indicative of an increase or decrease in the parameter. On the other hand, in non-parametric data, such cutoffs may be somewhat more difficult to apply, as shown in FIG. 8A(2), wherein semantic variable(s) 87, 87' are indicated and the user modifies a weighting or boundary by selecting up 85 or down 86 arrows. Even in these cases, however, such parameters which have a monotonically increasing value over a range may still exist. These include proximity operators, number of occurrences of a search term in a set member, root analysis of search terms, and semantic variables.

Figure 8B:
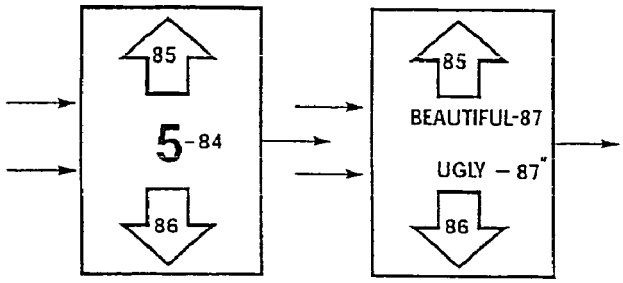
FIGS. 8A(1) and 8A(2), 8B, 8C, 8D and 8E show, respectively, a set of parametric and non-parametric variable icons, a Venn diagram icon employed in variable alteration mode, a parametric icon (e.g., word proximity) as a post modifier for a Venn diagram icon, a multidimensional median and range operator parametric icon and a dialog box with slider controls.
Figure 8B:
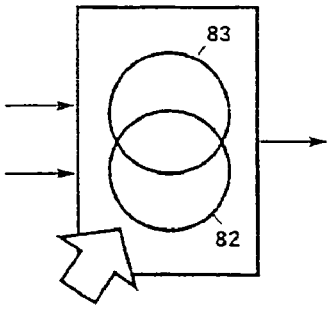

For example, as shown in FIG. 8B, with respect to a full text proximity operator, the size of a circle 82 represents the operator for a single set inclusion rule, which is more generally a continuous or stepwise continuous variable. For example, a truncation, semantic analysis, thesaurus, or relevance rule may be applied based on this operator. The set inclusion operator need not be unidimensional, and in the case of a multidimensional set inclusion rule, the user will, for example, double click on the graphic object or portion of the object to display a multidimensional graph, such as a circle having a plurality of spaced radially oriented axes, e.g., a star graph. The shape of the star graph may be altered by resizing any of the radially oriented axes.

Figure 8C:
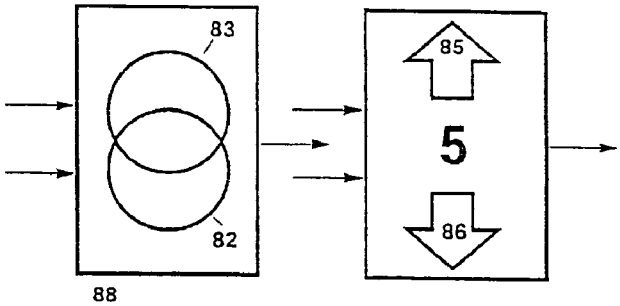

As shown in FIG 8C, the parametric (or non-parametric) icon may be provided as a single input function, applying a threshold to the represented data set from the Venn operator icon 88.

Figure 8D:
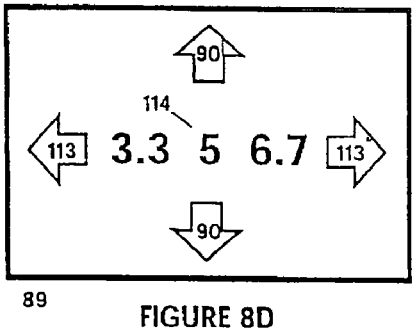
Figure 8E:
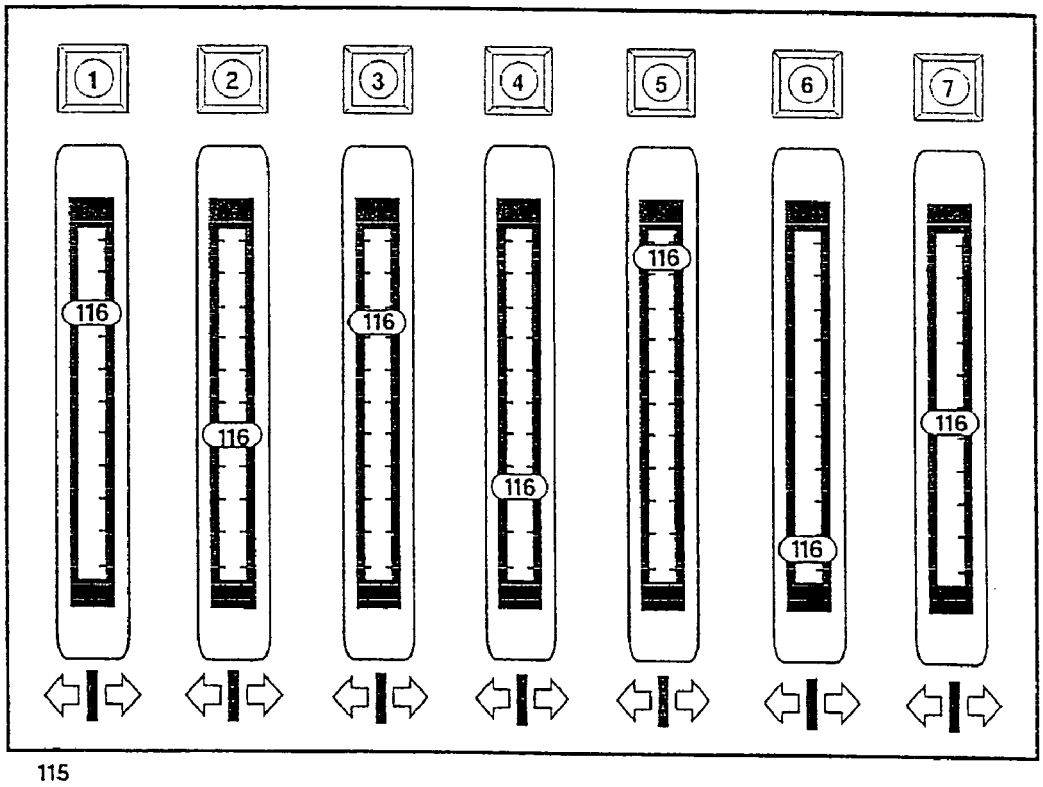

Likewise, the parametric (or non-parametric) icon may represent a multiple degree of freedom operator 89, such as mean 90,90' and range 113, 113', as shown in FIG. 8D. Two degrees of freedom may represent a practical limit for allowing feedback of the criterion 113, while greater numbers of degrees of freedom are better represented in a full dialog box 115 with, for example, individual slide controls 116 for each degree of freedom.

Where the icon or graphic representation is altered by a manipulation, it is often helpful for a window to display a corresponding change to the explicit search expression, and for changes to propagate through the entire search strategy after being finalized. A multiple level "undo" and "redo" capability is therefore helpful. In Internet applications, this process is usually available through "backward" and "forward" icons.

Where the database is easily and efficiently accessible, it is preferred that the search strategy be updated after the user makes a search strategy modification, so that feedback may be obtained immediately. On the other hand, where a penalty is incurred by accessing the database, it is preferred that the user be given an opportunity to make all desired changes as a group before submitting the search. Therefore, the user is given this choice or the system obtains this information and acts accordingly.

According to the present invention, new interface constructs need not be implemented, and therefore known GUI elements, such as buttons, dialog boxes, multiple view windows, pull-down or pop-up menus, button bars, status bars, context sensitive pop-up windows, scrolling and drop-down lists, scroll bars, garbage can icons, blow-up and shrink-down, and the like, may be usefully employed. Therefore, typical GUI system application development tools and libraries may be used to implement the present system.

The overlap between two circles 82, 83 represents a set inclusion operator between the two sets represented by the circles, and a unidimensional rule may be altered by moving one circle with respect to the other. Again, in the case of a multidimensional set inclusion rule, a multidimensional graphic representation may be accessed by a secondary operation. In general, in each case, one designated default operator will be represented by the unidimensional alteration of the iconic representation, while some or all of the set inclusion properties may be accessed by way of the secondary operation.

Thus, to generate a query, producing a resultant data set, the user first defines a plurality of set inclusion criteria, using any known method, including explicit definition of these criteria. These criteria may be schematic or imprecise, and indeed an advantage of the present invention is its ability to graphically assist the user in refining the search after initial entry; however, the initial search should be valid, so that it may be used as a point of reference for direction of modifications. For this purpose, the search expression entry system may include a syntax checker and/or an expert assistant system for helping to define an initial search.

As stated above, a graphic indication may be presented to the user of the results of the search, fur example magnitudes and ratios of relevant set members. These may be presented as bar graphs, or other known types of graphic indications.

After a search strategy is defined, the user may request the system to perform an analysis of the search to determine whether search terms are redundant, contradictory, or overly or underly inclusive. This analysis may be done by a logical analysis of the search itself, or by an analysis of the set members differentiated by the various criteria. The results of this analysis, if performed, may be presented to the user for action, or used to automatically modify the search. Where an automatic modification is provided, the system acts in accordance with general guidance provided by the user. For example, where the user inputs an inferential search which is translated by a semantic parsing engine, the system according to the present invention may look to the original inferential search query to determine an intent of the user, and may override the semantic parsing engine, without intervention by the user. On the other hand, where the user specifically inputs a search query, the system must generally seek guidance from the user before altering the search strategy.

This guidance may come in the form of responses to computer-generated queries, or user manipulation of icons in a manner which is interpreted by the system to allow alteration of one or more search expressions. This manipulation includes selection of portions of graphic elements, and repositioning or resizing on the display with respect to the other graphic objects, to represent a set operation to be performed on the data set. Each set representation includes graphic objects which are "selectable" and modifiable, meaning the graphic object may be operated on separately from other graphic objects, but more importantly, any new data sets resulting from the set operation are represented by a secondary (or tertiary, etc.) graphic object which is also "selectable". Further, these primary and higher order sets can also be graphically merged or re-merged by a drag technique.

In a complex search, the chain or operations may be formidably large. In a preferred embodiment of the invention, a user, when viewing a particular part of a chain of operations, can zoom in (enlarge) or zoom out (contract) in relation to an area of interest, or create a fish-eye view with a focus on that area, i.e., provide selective detail on a portion of the graphic space.

The present system is not limited to searching data sets using crisp logic, and may therefore include fuzzy logic searches having corresponding set inclusion properties and set member rankings. In this case, the manipulation of graphic objects need not be limited to binary relationships, and therefore in amount or proportionality of movement may be used to indicate a set inclusion property or set function. The manipulation of the graphic element, in this case, may be used to alter a boundary function of a fuzzy set.

It is noted that search strategies may be modified implicitly by methods other than graphic manipulation. For example, a user may define a desired result parameter, which the system then uses to tune the search strategy to achieve this parameter. For example, a user may seek the 100 "best" results with given criteria, and thus the system may then analyze the database to determine an optimum search strategy, which is then implemented.

Artificial intelligence may be applied to analyze the composite set inclusion criteria, and to propose an analogous change to the search which corresponds to the gesture or indication of the user. Thus, in a full text proximity searchable system, a search criteria A AND B might, for example, be narrowed in the order of A (same section) B, A (same paragraph) B, A (same sentence) B, A (adjacent) B. Alternately, the word spacing between A and B may be narrowed by successively reducing the operator, A (within n words of) B. Using artificial intelligence, these various schemes may be intermixed or hybridized, and indeed, the search strategy may be tuned based on a number of reported hits, if too low, the strategy is made less restrictive, if too high, it is made more restrictive, according to the hierarchy of the search.

Where a result is requested based on a number of "best" set members, a ranking criterion may be applied. Generally, such a ranking requires a more thorough analysis of the set members, although simple ranking schemes are also known. For example, date, size, numeric or alphabetic ordering and the like may be applied as appropriate.

In analyzing system output, a user may review output set membership, and manually include, exclude or rank members. The system may then formulate an "intelligent agent" which extracts a ranking or inclusion rule to complete the task or to search other data spaces for relevant data.

When ranking a set member, the primary set inclusion criterion is fulfilled, and only then is a secondary criteria applied to order the set members. The ranking is generally applied where the next stage of the process truncates the first set based on this ranking, for example taking only a certain number of set members or those having a ranking score above a certain level. In some instances, the ranking is directly related to the search criterion, i.e., the ranking is along the same scale as the limiting variable. In other instances, this ranking is truly a secondary operation and has little to do with the primary criterion, such as date ordering, or other criteria extrinsic to the primary search criterion.

The interface system may, as a default, present set members to the next stage or output according to the inclusion criteria, with a weighting test where multivariable inclusion criteria are employed. The user then may modify this ranking by, for example, opening a text dialog box or a graphic window. In certain instances, the ranking criterion may be defined by graphically manipulating an icon or graphic image in corresponding manner to the set inclusion criterion, while in other instances it is preferably defined explicitly by the user. Thus, in a multivariate set inclusion criteria, the user may be presented with a star graph icon for defining the relative weighting of each of the multiple variables in the rankings.

Once the set inclusion and ranking are defined, these may be manipulated in multiple set operations. Preferably, sets are handled two at a time, with a simple two set Venn diagram representing the operations. In some instances, however, it may be desired to have a larger number of sets combined in a single operation, and more complex icons may be provided for this purpose. A four input set operator icon is provided as shown in FIG. 5B. In this icon, each circle has at least three degrees of freedom, X-axis, Y-axis and radius, representing a distance from a vertically aligned circle, a horizontally aligned circle, and a set inclusiveness function, respectively This, however, does not allow an easily accessible relationship to be defined with respect to a diagonally oriented circle.

Thus, a multiple set icon is preferably employed only where a small amount of control over the output is required, for example for relatively simple set relations, such as AND, OR, and NOT, to tune set inclusion properties of a set, and rank the resulting output set. After defining the Venn set spaces selected for the output by the Boolean logic operations, the area representing portions of the set space may be relatively enlarged or contracted by graphic manipulation of the boundaries of the region, for example. In like manner to the single set operations, a continuous or stepwise continuous variable is altered based on the graphic manipulation. Also in like manner to single set operations, a default variable is established with potential for override by the user and manipulation of multiple variables. Where the search itself does not allow or suggest such a variable, the user may request the user to define how he or she would like the search to be modified. The output set may be ranked according to default criteria corresponding to the input sets and/or the set operation between the multiple sets.

While, as discussed above, the tuning of the single set inclusion is separated from the multiple set operations, it is also possible to tune both the input and output set inclusion properties by graphic manipulation of a multiple set icon. Thus, since each input set is signified by a bounded region in a Venn diagram, the border of the bounded region may be enlarged or contracted to alter the set inclusion property. Further, any region or regions may be selected for attempted manipulation, including the region outside the defined set spaces, the intersection and non-overlapping portion of each set. Likewise, the ranking of the each region in the Venn diagram, or composite regions, may be ranked.

Where an icon representing multiple sets is employed, an additional gesture is available for indicating to the interface that a manipulation is desired. Therefore, not only may the size of a region by manipulated, but also the relative spacing and arrangement of the spaces. For example, where the intersection space is relevant to the definition of the output set, a relative movement of one set boundary away from the other may be interpreted as narrowing the inclusion criteria for the intersection. Likewise, a movement toward one another may be interpreted as an instruction to broaden the set inclusion criterion.

In the case of Venn diagrams in this paradigm, a range of graphical modifications are possible, representing different types of possible set operations. For example, set A may be defined as word X within n words of word Y in a full text database search. The initial search may be performed with n=5. In this case, a change in size of the boundary may be interpreted as changing n, so that a larger boundary increases n while a smaller boundary decreases n. The number of set elements which meet the set inclusion criteria may be indicated, to allow feedback as to the effect of the modification. In like manner, a multidimensional change in size or metric (e.g., shape) may be implemented where the set inclusion criteria are more complex. On the other hand, where two sets, A and B are defined, their spatial relationship in the graphic representation may be interpreted as their degree of overlap. By changing the spatial relationship of the representations of set A and B, the set inclusion criteria for the underlying sets as well as their union and intersection may be controlled. In some instances, this is impossible, for example where the represented set inclusion criteria do not include any continuous or stepwise continuous formulation. In this case, the user interface rejects an attempt to graphically modify the configuration of the graph. For such a change to be made, the user must alter the underlying concrete set inclusion criteria or define a subsidiary ranking method. On the other hand, the overlap between two sets may have an element of gradation, and therefore the positional manipulation would be interpreted as changing a threshold, ranking criteria, set inclusion property, or another aspect, as possible given the underlying set inclusion properties.

Where a number of possible interpretations of a manipulation are possible, the interface may guess the most appropriate interpretation or seek elucidation from the user. Thus, the user may enter set inclusion criteria which result in 100 "hits" or data records or portions of records which correspond to the criteria. The user, however, may seek an output including only 50 such hits. Therefore, the user selects the bounded region of the GUI which corresponds to the desired hits, and graphically seeks to resize the area. Where the search criteria. includes a single continuous or stepwise continuous parameter, the interface may interpret the resizing as a command to vary this parameter. Where the resulting data set is ranked, i.e., where there is an algorithm for determining a relevance or importance of elements which meet the set inclusion property, the resizing may also be used to vary a threshold, below which the data is not considered within the boundary. Where there are a number of possible analogies to the resizing, the interface may seek specific guidance from the user, have different resizing commands, employ a multidimensional resizing command, with the various dimensions representing the various degrees of freedom to modify the set inclusion properties, or the interface may guess the correct interpretation, using a set of artificial intelligence rules, an adaptive interface, or contextual analysis of the data sets or data space. Of course, a combination of these strategies may also be used.

Another aspect of the present invention provides a ranking algorithm based on an extrinsic database, such as a known citation index, such as the Science Citation Index or Social Science Index, which includes major scholarly references, with indication of the identity of the authors, affiliated institution, journal, cited references, title, and possibly abstract and key words. Such an index, when employed to rank the relevance or importance of the results of a search in another database, provides a sophisticated means for evaluating references. Typically, a search of various topics will yield hundreds or thousands of "hits". In this case, it is desired to present the "hits" in a logical order, so that relevance or importance declines as the list is reviewed in order, allowing a truncation of review of the search results without reviewing all of the references and allowing a cutoff to be less arbitrarily imposed. Thus, for example, if literature review references are desired, the sort or rank criterion is number of cited references. If scientific importance is desired, then the number of citations to that reference is the sort or rank criterion. Other criteria which may be employed include the importance of the journal, which may be defined by the user or derived from a statistical analysis of the citation database itself, the importance of the institution(s) with which the authors are affiliated, the number of cites to articles by an author, or any other single criterion or hybrid of multiple criteria. Each of these ranking criteria may be derived from the citation database, thus allowing standardization and ease of updating. Thus, while such a system has certain limitations, it provides an additional tool for ranking of references. The use of citation indexes is especially useful because databases of such information are available on-line and on CD-ROMs, making implementation possible without having to amass this data separately for implementation of the interface system.

Likewise, where relevant, Internet Usenet postings provide similar opportunities, such as by employing "DejaNews" (http://www.dejanews.com), "AltaVista" (http://www.altavista.digital.com) or other search engines which allows a search for all posts by an author. In this case, institution information may be less reliable, however, domain name may be useful information. Further, the "citations" of the citation indices on the Internet Usenet correspond to the posting threads, which allow related postings to be grouped together. Of course, other types of mass indexed databases may be used to rank the set outputs, where the set space has a significant relation to the database from which the index is created.

While for many envisioned set definitions, a Venn diagram, defining Boolean logic spaces is sufficient, in other cases, other data relationships may be desired or required. Thus, alternate or additional symbols may be employed. For example, a time delay or relative time difference may be represented by a clock in a box-icon; exclusive or (XOR) represented by two circles with one or two lines separating them, in a rectangular box; and a merger or mixing represented by a funnel.

EXAMPLE 2

Instead of entering set definitions, as provided in the method according to Example 1, a user defines a search using prior known techniques, such as natural language searching, query by example, or other known techniques. Using these techniques, a search expression is constructed, using e.g., Boolean and other data relationships, which is normally not employed by the user. However, according to the present invention, this derived search strategy is presented as a series of icons interconnected in accordance with the present invention, such as is shown in FIG. 7. Thus, the user need not explicitly define the search parameters, but rather, an automated or intelligent system may be employed to generate the initial search.

After the search is formulated using the known prior art techniques, the user is presented with the results. While these results may sometimes be acceptable, often the user desires a search of differing scope than that presented. Therefore, the interconnected icons may be manipulated to provide a degree of explicit control over the search expression. For example, search limitations may be eliminated or bypassed by eliminating an icon or selecting the output to be equal to one of the inputs. Further, the logical relationships may be modified by selecting or deselecting set relationships, i.e., Boolean set spaces. According to the present invention, parametric search expressions may be altered by manipulation of individual icons, as discussed above.

Where the screen display is generated based on a search strategy indirectly inputted by the user, and sometimes even where expressly inputted by the user, it may be desirable to include on the main display the individual search expressions. Thus, proximate to the icon representing the search expression is a text or data window presenting the search expression itself, similar to that shown in FIG. 10, or a screen button for easily accessing the search expression. This will allow a user to view both symbolic and concrete expressions in the same view. In this case, the graphical representations and the text or data representations are preferably linked, so that where one is updated or changed, the corresponding other is also updated or changed. Likewise, where multiple search expressions are chained or linked, a change in any one preferably propagates through to the output.

The changes that a user makes to a search may be indicative of the user's desires and characteristics. Therefore, an option is provided for the system to learn from the user in order to tailor future searches in accordance with the user's desires and characteristics. Generally, the user will explicitly select particular changes to the search as demonstrative of these desires and characteristics. These changes are generally to be applied to the original search formulation, i.e., at the level of input translation to explicit search formulation. However, where the system which formulates the search strategy is not adaptive, these adaptive features may be incorporated into the interface system according to the present invention. In this case, the present system acts as a post-translator to apply modifications to a search from the initial translator and before presentation to the user. This two-step process has the advantage of allowing the user to return to the default search strategy from the initial translator without exiting the graphic search formulation system according to the present invention.

While the above detailed description has shown, described and pointed out the fundamental novel features of the invention as applied to various embodiments, it will be understood that various omissions and substitutions and changes in the form and details of the system and method illustrated may be made by those skilled in the art, without departing from the spirit of the invention. Consequently, the full scope of the invention should be ascertained by the appended claims.

What I claim is:

1. A graphic user interface method for defining *a* database query [definition and] output representation operation [parameters of a database] *parameter*, *the method* comprising [the steps of]:

graphically representing [a query definition or] *an* output representation operation *of a database operation* on

[the] *a* data set, said graphic representation having a graded representation portion;

receiving [from the user] *a signal representing* a *user* manipulation of [the] *a* grade of *the* graded representation portion; [and]

translating the manipulation of the graded representation into a database [query definition or output representation] operation parameter [for the database]*; and* receiving [the] *an* output database set *from the database* in accordance with the database [query definition of output representation] operation parameter*, an arrangement of members of the output database set being responsive to manipulation of said graded representation portion*.

2. The method according to claim 1, wherein said data set comprises free form text.

3. The method according to claim 1, [wherein said database operation parameters comprise] *further comprising receiving a database query comprising* Boolean search parameters.

4. The method according to claim 1, wherein said graphic representation comprises a bulls'-eye.

5. The method according to claim 1, wherein said graphic representation comprises a pyramid.

6. The method according to claim 1, wherein said manipulation comprises a gesture.

7. The method according to claim 1, wherein said manipulation comprises selecting a start position within the graded representation portion and subsequently displacing a graphic cursor with respect thereto.

8. The method according to claim 1, [wherein said] *further comprising receiving a* database operation [parameters comprise] *parameter comprising* at least one numerical operator defining an expansiveness of a set inclusion property.

9. The method according to claim 1, wherein said database operation parameter comprises a statistical parameter.

10. The method according to claim 1, wherein said database operation parameter modifies a presentation of results of a Boolean search expression.

11. The method according to claim 1, [wherein said] *further comprising receiving a* database operation parameter *through manipulation of a graded representation portion, which* modifies a set inclusion property of a Boolean search expression.

12. The method according to claim 1, [wherein said] *further comprising receiving a* database operation parameter [comprises] *through manipulation of a graded representation portion, which modifies* a non-Boolean search parameter *of the database*.

13. The method according to claim 1, wherein the [user] manipulation comprises a gesture for affecting a relative size, shape or position of the graded representation portion.

14. The method according to claim 1, wherein the database operation parameter comprises an output ranking.

15. The method according to claim 1, further comprising [the steps of] receiving a further database operation parameter [from the user] *through user manipulation of a graded representation portion*, the database operation parameter and further database operation parameter being selected from one or more of the group consisting of a set inclusion property and a set ranking property*, which together determine and arrange the output set*.

16. The method according to claim 1, wherein a set inclusion criterion [resulting from evaluation of the database operation parameter] *of the output database set* is based on an intrinsic characteristic of [the] elements of the database, and a ranking *of members* included [elements] in [an] *the* output set is based on a characteristic extrinsic to the [elements] *members* of the [database] *output database set*.

17. The method according to claim 1, further comprising [the steps of]:

[evaluating the] *receiving a* database operation parameter to [produce an] *define the* output *database* set;

representing the output database set as a second graphic representation having a graded representation portion;

receiving [from the user] a *user* manipulation of [a graded of] the graded representation portion of the second graphic representation; and translating the manipulation of the graded representation of the second graphic representation into a second database operation parameter for the output *database* set.

18. The method according to claim 1, wherein said graphically representing [step] is adaptive to [a style of the user] *activity regarding the graphic representation*.

19. The method according to claim 1, further comprising [the step of] altering the functioning of the graphic user interface based on preferences [of the user, the preference being] derived from monitoring [the] past activities [of the user].

20. The method according to claim 1, further comprising [the step of] transmitting the database operation parameter through a computer network to a remote database server.

21. The method according to claim 1, wherein:

said graded representation portion comprises at least one graphic control having a [liner] *linear* depiction; and said manipulation comprises a movement of a graphic element along the [liner] *linear* depiction.

22. The method according to claim 1, wherein:

said graded representation portion comprises a plurality of graphic controls, arranged in an array and [each] *individual ones of the plurality of graphic controls* having a [liner] *linear* depiction; and said manipulation comprises a movement of a graphic element along the [liner] *linear* depictions.

23. The method according to claim 1, wherein the database [contains] *comprises* a set of referential data records, [each] *individual ones of the referential data records* having an identifier, and *content* information [relating to the content of the database and identifiers of a subset of the referential data records], *at least a portion of said set of referential data records being referenced by other data records,* further comprising [the steps of] sorting identifiers of the [subset] *data records included as members of the output database set* based on a primary search criterion and an analysis of a relation of references of the database.

*24. A non-transitory computer readable medium having therein computer instructions for controlling a computer to perform the method of claim 1.*

*25. A method comprising:*

*providing data for display of at least one graded representation portion representing application of an output criterion to a data set;*

*receiving a signal representing at least one of a graphic manipulation of the graded representation portion or a query defined based on a graphic manipulation of the graded representation;*

*determining a query defined based on a graphic manipulation of the graded representation in response to receiving a signal representing the graphic manipulation of the graded representation;*

*transmitting electronic data representing a query defined based on a graphic manipulation of the graded representation portion to an automated query response system; and*

*receiving a query response set from the automated query response system, the query response set comprising a plurality of items in dependence on the query and having*

*an arrangement varying in dependence on a second output criterion derived from the graphic manipulation of the at least one graded representation portion of the output criterion.*

*26. The method according to claim 25, wherein the at least one graded representation portion comprises a plurality of quantitative graphic representations, individual ones of the plurality of quantitative graphic representations configured to be separately graphically manipulated.*

*27. The method according to claim 25, wherein the graded representation portion comprises a scale, wherein a desired quantitative value is selected based on a manipulation of the scale.*

*28. The method according to claim 25, wherein the automated query response system comprises a search engine.*

*29. The method according to claim 25, wherein the electronic data is transmitted over the Internet.*

*30. The method according to claim 25, wherein the output criterion comprises a sort criterion.*

*31. The method according to claim 25, wherein the output criterion comprises a ranking criterion.*

*32. The method according to claim 25, wherein the graded representation portion comprises the output criterion and a quantitative modifier for a semantic query.*

*33. The method according to claim 25, wherein the automated query response system operates on data records comprising records having links to other data records or records which are linked to by other data records, a ranking of data records represented in the query response set being dependent on the links to or from other data records.*

*34. A non-transitory computer readable physical medium having stored therein computer instructions for controlling a computer to perform the method of claim 25.*

*35. A graphic user interface method comprising:*

*providing signals for graphically representing a predefined icon of the graphic user interface for defining an output representation operation on the database, said icon having a graded representation portion;*

*receiving a signal representing a user manipulation of the grade of the graded representation portion; and*

*receiving an output database set in accordance with a database output representation operation parameter derived from the user manipulation of the graded representation portion, wherein*

*the output database set is received in accordance with the database output representation operation parameter, and*

*an arrangement of members of the output database set is dependent on said database output representation operation parameter.*

*36. The method according to claim 35 further comprising translating the manipulation of the graded representation portion into the database output representation operation parameter for the database.*

*37. The graphic user interface method according to claim 35, further comprising:*

*providing signals for display a plurality of predefined icons representing respective output representation operations on the database;*

*receiving signals representing user manipulation of grades of a plurality of graded representation portions;*

*translating the manipulation of the grades into a plurality of database output representation operation parameters for the database;*

*receiving the output database set in accordance with the plurality of database output representation operation parameters, and*

*wherein an arrangement of members of the output database set is dependent on said plurality of database output representation operation parameters.*

*38. A graphic user interface method comprising:*

*providing data for display of a graphic representation of an output from the database, said graphic representation having at least a graded representation portion;*

*receiving a signal representing a manipulation of a grade of the graded representation portion of the graphic representation of the output from the database;*

*translating the manipulation of the grade into a database output representation operation parameter for the database;*

*determining an output database set in accordance with the database output representation operation parameter; and*

*providing data for display representing arranged members of the output database set in dependence on the database output representation operation parameter.*

*39. A method comprising:*

*receiving through a pointing device of a graphic user interface at least one signal relating to a manipulation of a grade of at least one graded representation portion of a desired output arrangement, the at least one graded representation portion comprising a representation of an output criterion as applied to a data set;*

*transmitting electronic data representing at least one of a defined query based at least in part on the at least one signal or the manipulation of the grade of the at least one graded representation portion to an automated query response system; and*

*receiving a response from the automated query response system, the response comprising data representing a plurality of items arranged in dependence on the manipulation of the grade of the at least one graded representation portion.*

*40. The method according to claim 39, wherein the graded representation portion comprises a plurality of multivalued graphic representations, individual ones of the plurality of multivalued graphic representations configured to be separately manipulated through the pointing device.*

*41. A method comprising:*

*receiving at a server a signal relating to a user manipulation of a grade value represented by at least one graded representation portion having at least three states, the at least one graded representation portion comprising a representation of an output criterion as applied to a data set;*

*defining a query based at least in part on the signal;*

*transmitting electronic data representing at least one of the query or the user manipulation of the grade value to an automated query response system; and*

*receiving a response from the automated query response system, the response comprising data representing a plurality of items responsive to the query or the user manipulation of the grade value;*

*making the response from the automated query response system available for display in an arrangement in dependence on the user manipulation of the grade value.*

*42. The method according to claim 41, wherein the signal received through the graphic user interface relates to a separate manipulation of a grade value represented by a plurality of graded representation portions.*

*43. A non-transitory computer readable medium having therein computer instructions configured to control a computing device to perform operations comprising:*

*providing data for display of a graphic representation of an output from a database, said graphic representation having at least a graded representation portion;*

*receiving a signal representing a manipulation of a grade of the graded representation portion of the graphic representation of the output from the database;*

*translating the manipulation of the grade into a database output representation operation parameter for the database;*

*determining an output database set in accordance with the database output representation operation parameter; and*

*providing data for display representing arranged members of the output database set in dependence on the database output representation operation parameter.*

*44. A non-transitory computer readable medium having therein computer instructions configured to control a computing device to perform operations comprising:*

*receiving through a pointing device of a graphic user interface at least one signal relating to a manipulation of a grade of at least one graded representation portion of a desired output arrangement, the at least one graded representation portion comprising a representation of an output criterion as applied to a data set;*

*transmitting electronic data representing at least one of a defined query based at least in part on the at least one signal or the manipulation of the grade of the at least one graded representation portion to an automated query response system; and*

*receiving a response from the automated query response system, the response comprising data representing a plurality of items in dependence on the manipulation of the grade of the at least one graded representation portion.*

*45. A non-transitory computer readable medium having therein computer instructions configured to control a computing device to perform operations comprising:*

*receiving a signal relating to a user manipulation of a grade value represented by at least one graded representation portion having at least three states, the at least one graded representation portion comprising a representation of an output criterion as applied to a data set;*

*defining a query based at least in part on the signal;*

*transmitting electronic data representing at least one of the query or the user manipulation of the grade value to an automated query response system; and*

*receiving a response from the automated query response system, the response comprising data representing a plurality of items responsive to the query or the user manipulation of the grade value;*

*making the response from the automated query response system available for display in an arrangement in dependence on the user manipulation of the grade value.*

*46. An apparatus comprising:*

*a server configured to provide an applet executing in conjunction with a graphic user interface, the applet configured to receive through a pointing device of the graphic user interface a manipulation of a grade of at least one graded representation portion of a desired output arrangement, the at least one graded representation portion comprising a representation of an output criterion as applied to a data set and to transmit electronic data representing at least one of a defined query based at least in part on the at least one signal or the manipulation of the grade of the at least one graded representation portion to the server; and*

*wherein the server is configured to receive the electronic data from the applet and to send a response comprising data representing a plurality of items in dependence on the manipulation of the grade of the at least one graded representation portion to the applet for presentation in the graphic user interface in an arrangement in dependence on the manipulation of the grade value.*

* * * * *

UNITED STATES PATENT AND TRADEMARK OFFICE

CERTIFICATE OF CORRECTION

PATENT NO. : RE43,753 E
APPLICATION NO. : 10/728743
DATED : October 16, 2012
INVENTOR(S) : Szabo It is certified that error appears in the above-identified patent and that said Letters Patent is hereby corrected as shown below:

Title Page, Item (57), under "ABSTRACT", in Column 2, Line 13, delete "quautified" and insert -- quantified --, therefor.

Title Page, Item (57), under "ABSTRACT", in Column 2, Line 14, delete "fur" and insert -- for --, therefor.

On Title Page 2, Item (56), under "OTHER PUBLICATIONS", in Column 2, Line 7, delete "Ineraction" and insert -- Interaction --, therefor.

On Title Page 2, Item (56), under "OTHER PUBLICATIONS", in Column 2, Line 13, delete "Visulaization" and insert -- Visualization --, therefor.

In the Specifications

In Column 3, Line 11, delete "$\models$in" and insert -- $\models$ in --, therefor.

In Column 3, Line 36, delete "thereof," and insert -- thereof; --, therefor.

In Column 3, Line 46, delete "search." and insert -- search; --, therefor.

In Column 4, Line 12, delete "act" and insert -- set --, therefor.

In Column 5, Line 2, delete "au" and insert -- an --, therefor.

In Column 5, Line 38, delete "cumber" and insert -- number --, therefor.

In Column 6, Line 49, delete "it" and insert -- at --, therefor.

In Column 8, Line 3, delete "tertiary" and insert -- tertiary, --, therefor.

Signed and Sealed this
Sixteenth Day of July, 2013

Teresa Stanek Rea
*Acting Director of the United States Patent and Trademark Office*

In Column 8, Line 13, delete “mariner” and insert -- manner --, therefor.

In Column 9, Line 8, delete “toe” and insert -- the --, therefor.

In Column 9, Line 15, delete “fur” and insert -- for --, therefor.

In Column 9, Line 64, delete “tor” and insert -- for --, therefor.

In Column 10, Line 56, delete “in” and insert -- to --, therefor.

In Column 11, Line 4, delete “search” and insert -- search, --, therefor.

In Column 13, Line 5, delete “is” and insert -- as --, therefor.

In Column 13, Line 6, delete “fill” and insert -- full --, therefor.

In Column 14, Line 5, delete “to” and insert -- in --, therefor.

In Column 14, Line 42, delete “used to” and insert -- used in --, therefor.

In Column 17, Line 10, delete “filly” and insert -- fully --, therefor.

In Column 20, Line 53, delete “semiautomated” and insert -- semi-automated --, therefor.

In Column 20, Line 56, delete “change to” and insert -- change in --, therefor.

In Column 21, Line 2, delete “act” and insert -- set --, therefor.

In Column 21, Line 21, delete “is a apply” and insert -- is to apply --, therefor.

In Column 21, Line 60, delete “hiving” and insert -- having --, therefor.

In Column 23, Line 49, delete “fur” and insert -- for --, therefor.

In Column 24, Line 31, delete “in” and insert -- an --, therefor.

In Column 25, Line 36, delete “respectively” and insert -- respectively. --, therefor.

In Column 26, Line 53, delete “criteria.” and insert -- criteria --, therefor.

In the Claims

In Column 30, Line 12, in Claim 17, delete “for the” and insert -- for operation on the --, therefor.